(12) United States Patent
Mullins

(10) Patent No.: US 10,833,870 B2
(45) Date of Patent: Nov. 10, 2020

(54) CRYPTOGRAPHIC OPERATIONS IN AN ISOLATED COLLECTION

(71) Applicant: Microsoft Technology Licensing, LLC, Redmond, WA (US)

(72) Inventor: Christopher L. Mullins, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 206 days.

(21) Appl. No.: 15/400,141

(22) Filed: Jan. 6, 2017

(65) Prior Publication Data
US 2018/0198627 A1    Jul. 12, 2018

(51) Int. Cl.
| | |
|---|---|
| H04L 29/08 | (2006.01) |
| H04L 9/32 | (2006.01) |
| H04L 9/08 | (2006.01) |
| H04L 9/14 | (2006.01) |
| H04L 9/30 | (2006.01) |

(52) U.S. Cl.
CPC .......... *H04L 9/3249* (2013.01); *H04L 9/0822* (2013.01); *H04L 9/0877* (2013.01); *H04L 9/0897* (2013.01); *H04L 9/14* (2013.01); *H04L 9/302* (2013.01); *H04L 9/3066* (2013.01); *H04L 2209/76* (2013.01)

(58) Field of Classification Search
CPC .... H04L 9/3249; H04L 9/0822; H04L 9/0877
USPC ....................................................... 713/176
See application file for complete search history.

(56) References Cited

U.S. PATENT DOCUMENTS

| | | |
|---|---|---|
| 6,711,264 B1 | 3/2004 | Matsumoto et al. |
| 9,031,876 B2 | 5/2015 | Mittal et al. |

(Continued)

FOREIGN PATENT DOCUMENTS

| | | |
|---|---|---|
| CN | 101707524 A | 5/2010 |
| CN | 105515959 A | 4/2016 |
| WO | 2015163736 A1 | 10/2015 |

OTHER PUBLICATIONS

Graffi, et al., "LifeSocial.KOM: A Secure and P2P-based Solution for Online Social Networks", In Proceedings of 8th Annual IEEE Consumer Communications and Networking Conference, Jan. 9, 2011, pp. 554-558.

(Continued)

*Primary Examiner* — Anthony D Brown

(57) ABSTRACT

Examples of the present disclosure describe systems and methods for performing cryptographic operations in an isolated collection. In an example, a user may have an associated user resource within the isolated collection, which may be associated with a cryptographic key. Other users may access the user's key from a known location to manually or automatically perform one or more cryptographic operations. In another example, a key may be generated when initiating a group conversation. The key may be encrypted for and provided to each participant using each participant's public key. Each participant may then use the cryptographic key during the conversation. A new participant may receive authorization to join the conversation from an existing participant, wherein the encrypted key of the existing participant may be decrypted and re-encrypted using the new participant's public key. The new participant may then use the re-encrypted key to participate in the conversation.

20 Claims, 16 Drawing Sheets

(56) References Cited

U.S. PATENT DOCUMENTS

| | | | |
|---|---|---|---|
| 9,130,744 | B1 | 9/2015 | King et al. |
| 9,288,047 | B2 | 3/2016 | Brouwer et al. |
| 9,379,889 | B2 | 6/2016 | Bernsen |
| 2003/0021416 | A1 | 1/2003 | Brown et al. |
| 2003/0204741 | A1 | 10/2003 | Schoen et al. |
| 2007/0016785 | A1 | 1/2007 | Guay et al. |
| 2013/0034229 | A1* | 2/2013 | Sauerwald ............ H04L 9/0822 380/46 |
| 2015/0264042 | A1 | 9/2015 | Lord et al. |
| 2015/0350163 | A1 | 12/2015 | Brander et al. |
| 2016/0226661 | A1* | 8/2016 | Keidar .................... G06F 21/74 |
| 2018/0176192 | A1* | 6/2018 | Davis .................... H04L 9/3247 |

OTHER PUBLICATIONS

Montminy, et al., "On-The-Record: A Non-Repudiable, Authenticated, and Confidential Chat Client", http://userpages.umbc.edu/-montmin1/globecomSubmission.pdf, Retrieved on: Oct. 4, 2016, 5 pages.

Menezes, et al., "Chapter 13: Key Management Techniques", In Handbook of Applied Cryptography, Oct. 1, 1996, 48 Pages.

"International Search Report and Written Opinion Issued in PCT Application No. PCT/US18/012278", dated Apr. 19, 2018, 14 Pages.

\* cited by examiner

Query: http://.../set1/task123?$expand=taskOn($expand=attachmentOn)

Query: http://.../set1/task123?$expand=taskOn($expand=attachmentOn($filter=Subject eq 'Sets'))

CRYPTOGRAPHIC OPERATIONS IN AN ISOLATED COLLECTION

BACKGROUND

Cryptography may provide a variety of identity verification and data protection tools. As an example, the public key of an asymmetric key pair may be used to encrypt data and verify cryptographic signatures, while the private key of the asymmetric key pair may be used to decrypt data and generate cryptographic signatures. As a result, two parties may use a plurality of asymmetric key pairs (e.g., one key pair for each party) to communicate securely, verify the source of received data, and verify the identity of a counterparty. Traditionally, setting up such a cryptographic system has required at least one of a variety of key exchange protocols or mechanisms to ensure that users within the cryptographic system have access to the requisite keys used to perform such cryptographic operations (e.g., encryption and signature verification, among others).

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for performing cryptographic operations in an isolated collection. In an example, users may be associated with a user resource within the isolated collection. The user resource may be associated with one or more cryptographic keys, which may be automatically generated or received from the user. In some examples, providing a cryptographic key may be a prerequisite to gaining access to the isolated collection. In one example, a user may encrypt a resource by accessing a public key associated with a recipient that is stored by the isolated collection. In another example, a recipient may verify a cryptographic signature using a public key associated with a sender that is stored by the isolated collection. As a result, such cryptographic operations may occur automatically, because the requisite cryptographic keys are accessible to other users of the isolated collection from a known location.

In another example, a cryptographic key may be generated when a conversation session is initiated. Messages that are sent during the conversation session may be encrypted using the cryptographic key and stored in the isolated collection. In some examples, the messages may also be signed as discussed above. The cryptographic key may be encrypted for and provided to each conversation participant using each conversation participant's public key. When a new conversation participant wishes to gain access to the conversation session, authorization may be requested from and provided by an existing conversation participant. The authorization may cause the encrypted cryptographic key of the existing conversation participant to be decrypted, after which it may be re-encrypted using the new conversation participant's public key. The re-encrypted cryptographic key may then be provided to the new conversation participant, and it may then be used by the new conversation participant to access and participate in the conversation session.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
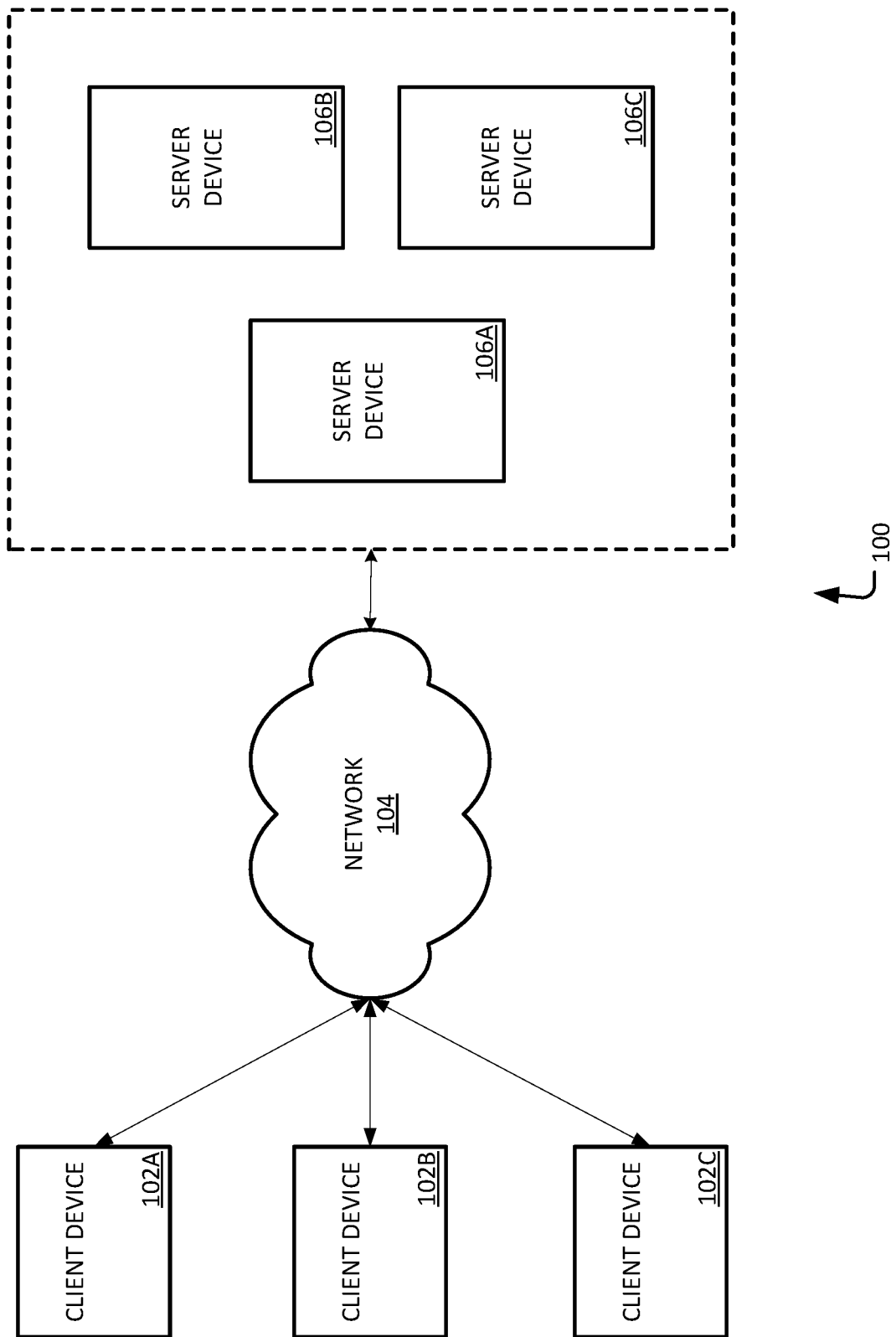
FIG. 1 illustrates an overview of an example system for performing cryptographic operations within an isolated collection.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure provides systems and methods for performing cryptographic operations within an isolated collection. A resource may be a document, information relating to a document (e.g., a revision, a comment or annotation, metadata, properties, etc.), a message, a conversation, a presence update or indication, a calendar event, a user resource comprising information relating to a user (e.g., a username, a user identity, an email address, a phone number, etc.), among others. A document may contain any kind of information, including, but not limited to, text data, image or video data, audio data, drawings, simulations, 3D models, cryptographic keys, shared secrets, calculations, algorithms, recipes, formulas, or any combination thereof. In some examples, a resource may be identified by a resource identifier, which may be a durable Uniform Resource Identifier (URI) pointing to the particular resource. The resource identifier may also be a uniform resource locator (URL), uniform resource name (URN), or other suitable identifier or pointers pointing to the resource itself. In one example, the resource may be stored within an isolated collection. In another example, the resource may be stored in a data collection, while an associated resource identifier may be stored in an isolated collection. For example, the resource may reside on a remote server, and the resource identifier may be used to retrieve the resource (e.g., the resource may be stored on a remote web server, where the resource identifier comprises a URL). Identifying the location of a resource may include parsing the resource identifier using, for example, regular expressions, providing one or more portions of the resource identifier to a search utility, executing the resource identifier, etc. Relationships within the isolated collection may identify a correlation between two or more resources in the isolated collection. In some examples, an isolated collection may be a plurality of universal data nodes (UDNs), a document graph, or other collection of resources and relationships.

The resources, or resource identifiers, and/or relationships may be provided by a developer or other external source. Such resources, resources identifiers, and relationships are referred to herein as asserted resources, asserted resource identifiers, and asserted relationships. Each isolated collection may also be enriched to create additional relationships and in some examples additional resource identifiers, by executing a ruleset against the data already in the isolated collection. The additional data generated through execution of such a ruleset is referred to herein as inferred data, such as inferred relationships, inferred resources, and inferred resource identifiers. Queries may then be executed against the isolated collection that includes both the asserted data and inferred data to provide richer results than would otherwise be available solely from the asserted data alone. The isolated collection may also be stored as graph database, and results to queries of the isolated collection may be displayed in a graphical format wherein resources are displayed as nodes and the relationships are displayed as edges, among other display formats (e.g., as a tree, a directed graph, a matrix, a table, etc.). As used herein, an isolated collection of resource identifiers and the relationships between those resources or resource identifiers may be referred as a "Set." Further, access to the isolated collection may be controlled through various techniques to provide additional security measures for the content in each isolated collection, and each isolated collection may have different rule sets to generate unique and different inferred data to meet the particular needs of each application.

Within an isolated collection, a resource may be signed and/or encrypted using a cryptographic key. In some examples, additional information (e.g., metadata, properties, etc.) relating to the resource (e.g., information about a cryptographic operation, a last-modified time, a view count, a security access control list, etc.) may be embedded in or associated with the resource. In one example, at least a part of a resource and/or the additional information relating to the resource may be encrypted, while at least another part of the resource and/or the related information may remain unencrypted. Further, different resources, resource parts, or information relating to a resource within the isolated collection may be signed and/or encrypted using different cryptographic keys. In other examples, a cryptographic key or part of a cryptographic key pair (e.g., a public key) may be stored within the isolated collection or at another known location in order to facilitate retrieval when performing a cryptographic operation. A cryptographic key may be a symmetric key or an asymmetric key pair comprised of a public key and a private key, among other key types. In one example, the public key may be used for encryption and signature verification, while the private key may be used for decryption and signature generation. In another example, the private key may be stored at a location or with access controls other than that of the public key, such that the private key is less widely-available than the public key.

A variety of cryptographic algorithms may be used, including, but not limited to, Advanced Encryption Standard (AES), Digital Signature Algorithm (DSA), Rivest-Shamir-Adleman (RSA), and Elliptic Curve Cryptography (ECC), among others, or any combination thereof. In some examples, one cryptographic key (or key pair) may be used for signing or verification operations, while another cryptographic key (or key pair) may be used to perform encryption or decryption operations. Each cryptographic key may have similar or different properties as compared to other cryptographic keys. As an example, each key may have similar or different key lengths or may use similar or different cryptographic algorithms, as well as other similar or different attributes that may be unique to a specific cryptographic algorithm. One of skill in the art will appreciate that other cryptographic algorithms, key types, or systems may be used without departing from the spirit of this disclosure.

A cryptographic key may be stored in a key vault. In one example, information relating to the cryptographic key may also be stored in the key vault, including, but not limited to, the type of algorithm, one or more initialization vectors, or a key expiration date. A key vault may be a software component (e.g., an isolated collection, an encrypted data store, an access-restricted database, etc.), or may be a hardware device (e.g., a hardware security module, a trusted platform module, or other cryptographic hardware device). One or more key vaults may be associated with a user (e.g., a user resource) and used to store cryptographic keys associated with the user. In some examples, cryptographic keys stored by a key vault may be encrypted using the user's public key, such that they may only be accessed using the user's private key. In one example, rather than storing a cryptographic key in a key vault associated with a user, the cryptographic key itself may instead be associated with the user and stored.

In another example, there may be a central key vault used to store cryptographic keys for one or more users. As an example, a central key vault may be used to retain cryptographic keys in order to satisfy data retention requirements or legal obligations, among other reasons. In one example, the central key vault may be encrypted such that the requisite decryption key is stored in escrow by a trusted third party. Access to cryptographic keys may be controlled using an access control list or other access control mechanism. In some examples, private keys associated with a user may be access-restricted or stored separate from related public keys such that only the user (or a small group of users, e.g., within a department, the user's managers, etc.) may access the private key, while related public keys may be more widely available and/or stored at a known location as described above.

A cryptographic key may be associated with an identifier. The identifier may be used to access or locate the cryptographic key (e.g., in a key vault, an isolated collection, a data store, etc.). In some examples, the identifier may indicate a specific key vault or provide another indication that may be used to locate the cryptographic key. Further, the identifier may be stored with or associated with the cryptographic key. As an example, a key vault storing a cryptographic key may also store the identifier associated with the cryptographic key. The key vault may index the cryptographic keys using the identifier in order to facilitate retrieval. The identifier may be a key fingerprint, a hash of the key or information relating to the key (e.g., MD5, SHA-1, etc.), or an identifier (e.g., a globally unique identifier (GUID), a uniform resource identifier (URI), etc.), among others.

A user may be one or more entities that access, modify, or interact with an isolated collection. As an example, a user may be an individual, including, but not limited to, a person or an employee having a specific position or job title (e.g., a system administrator, a manager, etc.). In another example, a user may be a group of people, such as an organization, a department within an organization, a list of people within a group, etc. In some examples, a user may be one or more entities within a computing system, including, but not limited to, a user account, an application, a service, a process, or a hardware or software module. One of skill in the art will appreciate that any entity may be a user without departing from the spirit of this disclosure.

A user may have one or more cryptographic keys associated with its user resource within an isolated collection. In certain instances, such an association may be a prerequisite to interacting with the isolated collection (e.g., accessing resources, storing resources, sending resources, creating relationships, and/or modifying relationships, among others). In one example, one or more cryptographic keys may be generated automatically, may be received or determined from another entity (e.g., from the user, a different hardware or software module, etc.), or any combination thereof. In some examples, one or more security policies may be applied to the cryptographic keys. As an example, the cryptographic keys may be required to use a certain algorithm, be of a certain length, or be stored in a certain way (e.g., using a cryptographic hardware device, an access-restricted data store, etc.), among others. The requirements may vary based on context, including, but not limited to, characteristics or attributes associated with the user or the data stored or accessed by the user within the isolated collection.

Users of the isolated collection may have the cryptographic keys associated with other users readily accessible at one or more known locations, thereby providing ready access to a user's cryptographic keys in order to perform cryptographic operations (e.g., signature verification, resource encryption, etc.). As an example, a resource may be automatically or manually signed using a user's cryptographic key (e.g., the private key of a key pair), such that other users may automatically or manually verify the cryptographic signature using the user's cryptographic key available from a known location (e.g., the public key of the key pair, which may be associated with the user's user resource). A resource may be automatically signed by a user when interacting with it (e.g., when the user authors a resource, modifies a resource, shares or sends a resource, etc.). Similarly, the signature may be automatically verified when another user accesses the resource. As an example, an anti-virus application may be a user and may, after determining that a resource is not malicious or otherwise infected, provide such an indication (e.g., as metadata, as one or more properties, as a relationship, etc.) accompanied by a signature generated using a private key associated with the anti-virus application (e.g., a cryptographic key associated with a user resource of the anti-virus application).

In another example, a resource may be automatically encrypted when a sender sends it to a recipient. In one example, the resource may comprise a flag indicating that the resource should not be sent unless the resource may be sent in an encrypted format. Given that the recipient's public key may be available from a known location, the sender may access a cryptographic key associated with the recipient (e.g., the public key of a key pair, which may be associated with the recipient's user resource). The sender may then encrypt the resource using the public key and provide the encrypted resource to the recipient. The recipient may access the private key of the key pair to decrypt the resource. In another example, accessing the private key may comprise providing at least a portion of data of the encrypted resource to a key vault containing the private key, wherein the key vault may decrypt a portion of the data and provide unencrypted data in response. As a result, the recipient need not receive the actual cryptographic key to perform a decryption or signature generation operation. In some examples, the resource may have also been signed by the sender as described above, so the recipient may also verify the sender's signature.

One or more asserted or inferred relationships may exist between a resource and a user resource. In one example, a relationship may be created when a user performs a cryptographic operation on the resource (e.g., when the user signs the resource, when the user encrypts the resource, etc.). In another example, there may already be a pre-existing relationship between the resource and the user resource (e.g., because the user authored or revised the resource, sent or received the resource, or engaged in a variety of other interactions with the resource). In some examples, the user associated with the user resource and the user performing the cryptographic operation may be different. For example, when a resource is encrypted by a first user using a second user's public key, a relationship may be formed between the resource and the user resource associated with the second user (rather than the user resource associated with the first user), thereby indicating that a cryptographic key associated with the second user may be used to decrypt the resource. As a result, it may be possible to determine a user associated with a resource by evaluating the relationships of the resource. Similarly, relationships of a user resource associated with a user may be used to determine one or more resources with which the user has interacted.

In order to encrypt a resource for decryption by a recipient, the user may access a user resource associated with the recipient. The user resource may have a relationship with one or more cryptographic keys, which may then be accessed and used to generate an encrypted representation of the resource. In one example, a key pair may be associated with the resource itself. At least one of the keys of the key pair may be access-restricted, such that it is not widely accessible (e.g., it may be accessible by the sender and the recipient or by users of a certain group, among others). In this example, the public key of the associated key pair may be used to generate an encrypted representation of the resource. The encrypted representation may be stored and/or provided to the recipient. Providing the resource may comprise transmitting the resource to the recipient or storing the resource in the isolated collection (as a new resource, overwriting or replacing the unencrypted resource, etc.) and providing a notification to the recipient, among others. In some examples, a relationship may be formed between the encrypted resource and the recipient (e.g., a "recipient" relationship), wherein the relationship may provide an indication as to which user's cryptographic key was used for the cryptographic operation.

In another example, a resource may be signed by a user (e.g., before or after transmitting the resource, to enable other users to validate the state of the resource, as a non-repudiation technique, etc.). The resource may be signed using a private key associated with the user or, in one example, associated with the resource. A relationship may be formed between the signed resource and a user resource associated with the user, such that it may be determined, based on the relationship, which user signed the resource. As a result, in order to verify the signature of the resource, the relationships of the resource may be evaluated to determine a user resource associated with the signer. The relationships of the signer's user resource may be evaluated to identify a public key associated with the signer, which may then be used to verify the signature of the resource.

Messages of a conversation session may be stored in an isolated collection, wherein messages of the conversation may be encrypted using a cryptographic key. As discussed above, the cryptographic key may be an asymmetric key pair or a symmetric key, among others. The cryptographic key may be generated when the conversation session is initiated. In some examples, an identifier associated with the cryptographic key may be stored in the isolated collection, such that relationships may be formed between the cryptographic key and messages transmitted during the conversation session. The cryptographic key may be distributed to the participants of the conversation. In one example, distributing the cryptographic key may comprise transmitting an encrypted representation of the cryptographic key to each user, wherein the cryptographic key has been encrypted with a user's public key as indicated by the isolated collection. Each user may then store the encrypted representation of the cryptographic key (e.g., in a key vault, in the isolated collection, etc.). In another example, the cryptographic key may be provided to a participant, after which the participant may encrypt and store the key (e.g., in a key vault, using a cryptographic hardware device, etc.). In one example, the key may be encrypted by the storage component as a result of storing the key. In some examples, the cryptographic key may be retained by the system (e.g., in a central key vault, in escrow by a trusted third party, etc.) in order to satisfy data retention policies or other legal obligations. When accessing the conversation session or transmitting a message, a user may decrypt the encrypted key using his/her private key and use the decrypted key accordingly. In some examples, messages communicated during the conversation session may be signed by a sender and/or verified by a recipient according to aspects disclosed herein. In another example, the decrypted key may be cached locally for at least a portion of the conversation session.

At some point, a new conversation participant may be added to the conversation session. The new conversation participant may request access from a previously-existing participant, which, if granted, may cause the encrypted cryptographic key of the previously-existing participant to be decrypted using the previously-existing participant's private key, and re-encrypted using the public key of the new conversation participant (e.g., as may be stored by the isolated collection). The new conversation participant may then store the encrypted cryptographic key, and use a decrypted representation of the encrypted cryptographic key to access and participate in the conversation session. As a result of receiving the cryptographic key, the new participant may be able to access messages that were encrypted using the cryptographic key even though they may have been communicated before the new participant joined the conversation session.

FIG. 1 illustrates an overview of an example system for performing cryptographic operations within an isolated collection. Example system 100 may be a combination of interdependent components that interact to form an integrated whole for performing delegated authentication. In aspects, system 100 may include hardware components (e.g., used to execute/run operating system (OS)), and/or software components (e.g., applications, application programming interfaces (APIs), modules, virtual machines, runtime libraries, etc.) running on hardware. In particular aspects, system 100 may provide an environment for software components to execute, evaluate operational constraint sets, and utilize resources or facilities of the system 100. In such aspects, the environment may include, or be installed on, one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic device. As an example of a processing device operating environment, refer to the exemplary operating environments depicted in FIGS. 10-13. In other instances, the components of systems disclosed herein may be distributed across and executable by multiple devices. For example, input may be entered on a client device and information may be processed or accessed from other devices in a network (e.g. server devices, network appliances, other client devices, etc.).

As presented, system 100 comprises client devices 102A-C, distributed network 104, and a distributed server environment comprising one or more servers, such as server devices 106A-C. One of skill in the art will appreciate that the scale of systems such as system 100 may vary and may include additional or fewer components than those described in FIG. 1. In some aspects, interfacing between components of the system 100 may occur remotely, for example, where components of system 100 may be distributed across one or more devices of a distributed network.

In aspects, client devices 102A-C may be configured to receive input via a user interface component or other input means. Examples of input may include voice, visual, touch and text input. The interface component may enable the creation, modification and navigation of various data sets and graphical representations. In examples, the various datasets may comprise (or be otherwise associated with), for example, resource identifiers, resource metadata, relationship information, asserted relationships, graphical mapping information, query data, rule sets, such as, for example, inference rules, authorization information, authentication information, etc., as discussed in further detail below. Generally, the datasets are stored on one or more server devices 106A-C and are accessible by the client devices 102A-C. In some examples, however, the datasets may be at least partially stored on one or more of the client devices 102A-C. The underlying resources represented in the various datasets may be stored locally or in a data store, such as a cloud storage application, accessible to client devices 102A-C. In at least one example, the underlying resources represented in the various datasets (or portions thereof) may be distributed across client devices 102A-C. For instance, client device 102A (e.g., a mobile phone) may locally store a first portion of the resources represented in the dataset, client device 102B (e.g., a tablet) may locally store a second portion of the resources, and client device 102C (e.g., a laptop) may locally store the remaining portion of the resources represented in the dataset. In examples, the client devices 102A-C may have access to all of the resources included in the data set, may have access to a subset of the resources included in the dataset, or, alternatively, may not have access to any of the resources included in the dataset.

Client devices 102A-C may be further configured to interrogate data stores comprising the resources corresponding to the resource identifiers in the various data sets. In examples, client devices 102A-C may interrogate content providers, such as server device 102A-C, via distributed network 104. The interrogation may include identifying the remote device on which a resource is located, and/or determining whether the remote device (or a service/separate remote device) has authenticated access to the resource. If access to the resource has been authenticated, client devices 102A-C may retrieve an authentication indication from the remote device. Client devices 102A-C may use the authentication indication to provide access to one or more of the various datasets comprising the corresponding resource identifier.

Server devices 106A-C may be configured to store and/or provide access to one or more resources. For example, server device 102A may be a web server, server device 102B may be a device comprising a collaborative messaging tool and a calendaring application, and server device 102C may be electronic mail server. Each of these devices may comprise a repository of resources that is accessible via one or more authentication mechanisms. In examples, server devices 106A-C may perform or monitor the authentication process when a request for a resource is received. If the authentication is successful, the authenticating device may store or maintain an authentication indication for a specified period of time. When the period of time expires, server devices 106A-C may remove or attempt to renew the authentication indication. In examples, server devices 106A-C may provide the authentication indication to an interrogating client device. In some aspects, server devices 106A-C may further be configured to store at least a portion of the various data sets and graphical representations, as discussed above.

Figure 2:
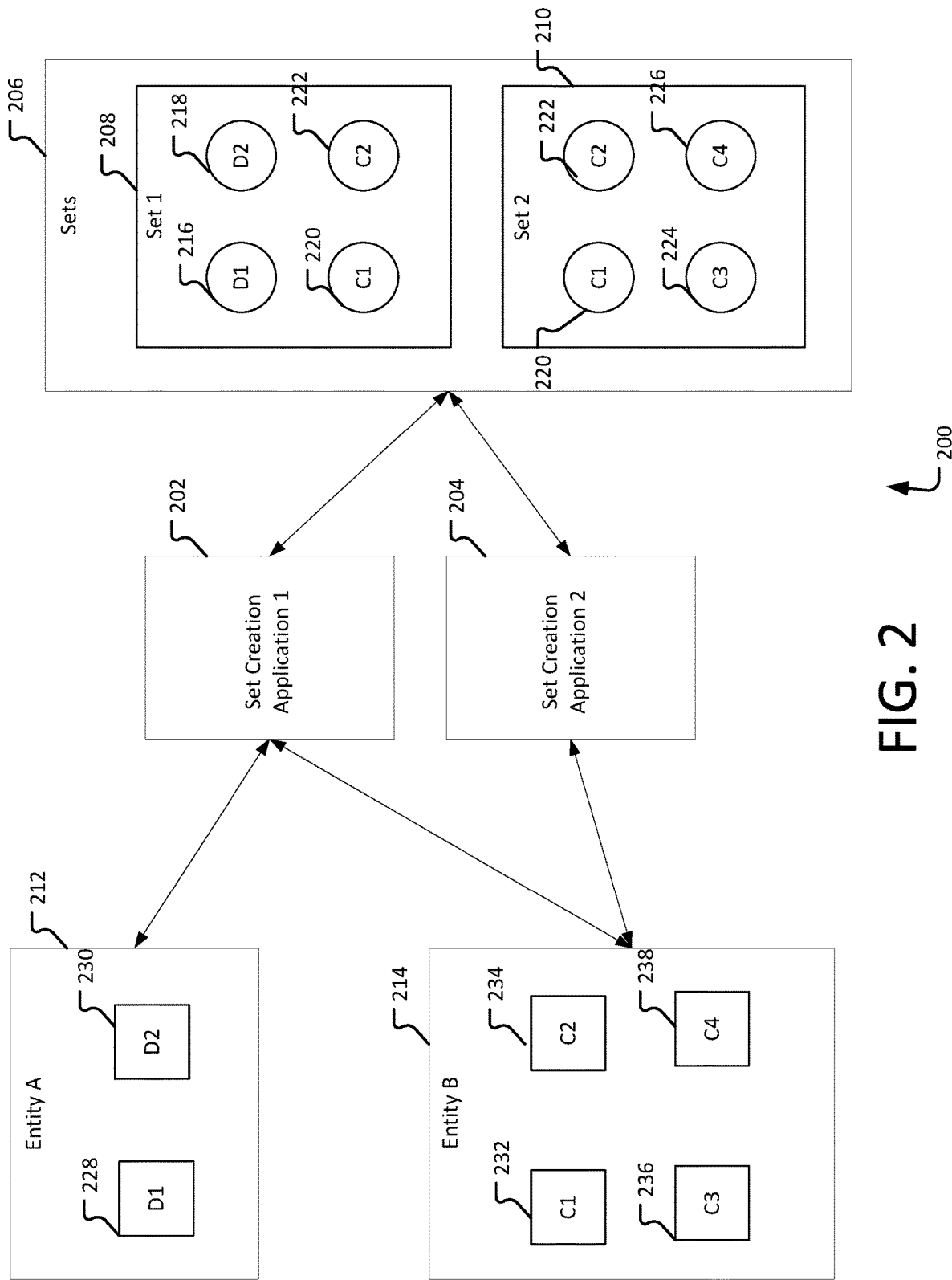
FIG. 2 illustrates an overview of an example system for managing isolated collections of resource identifiers and corresponding relationships.

FIG. 2 illustrates an overview of an example system 200 for managing isolated collections of resource identifiers and corresponding relationships. The isolated collection techniques implemented in system 200 may comprise or be associated with one or more of the delegated authentication techniques described in FIG. 1. In alternative examples, a single device (comprising one or more components such as processor and/or memory) may perform the processing described in systems 100 and 200, respectively.

With respect to FIG. 2, system 200 may comprise Set creation applications 202 and 204, Set environment 206, Sets 208 and 210, entities 212 and 214, resources identifiers 216, 218, 220, 222, 224 and 226, and resources 228, 230, 232, 234, 236 and 238. In aspects, Set creation applications 202 and 204 may be an application or service configured to create, infer, manipulate, navigate and visualize various resources, relationships and graphical representations. Set creation applications 202 and 204 may define collections of relationships between resources (e.g., people, files, tasks, mail, documents, calendar events, etc.) and executing queries on those collections. Set creation applications 202 and 204 may further provide for defining and storing rulesets used to infer one or more relationships in the collections, and displaying graphical representations of the collection data. The defined rulesets may be stored in the Set itself, and in some examples is stored as metadata within the Set. In examples, Set creation applications 202 and 204 may be installed and executed on a client device or on one or more devices in a distributed environment. For instance, Set creation application 202 may be installed on client device 102A, Set creation application 204 may be installed on client device 102B, and a Set creation service associated with server device 106A may be accessible to client device 102C.

In aspects, Set creation applications 202 and 204 may have access to a file directory or an execution environment, such as environment 206. Environment 206 may be collocated with a Set creation application, or environment 206 may be located remotely from the Set creation application. Environment 206 may provide access to one or more data collections, such as Sets 208 and 210. In examples, access to the data collections may be determined using one or more sets of permissions generated and/or maintained by Set creation applications 202 and 204. The sets of permissions may be different across one or more of the data collections. As a result, one or more of the data collections (or functionality associated therewith) may not be accessible from one or more of Set creation applications 202 and 204.

Sets 208 and 210 may respectively comprise isolated collections of asserted resource identifiers and corresponding relationships. The relationships in the isolated collections may be defined manually or may be automatically derived using one or more rulesets. The isolated collections may be represented using graphical structures that directly relate resources in the data collection and provide for retrieving relationship data with a single operation. Each isolated collection may comprise resource identifiers that are unique to that isolated collection. Alternately, the isolated collections may comprise resource identifiers included in one or more alternate isolated collections. For example, as depicted in FIG. 2, Set 208 may comprise resource identifiers 216, 218, 220 and 222, and Set 210 may comprise resource identifiers 220, 222, 224 and 226. Resource identifiers 216, 218, 220, 222, 224 and 226 may correspond to, and/or identify the location of, one or more resources. As used herein, a resource identifier references an existing resource, but is not itself a resource. Exemplary types of resource identifiers include, but are not limited to, a Uniform Resource Identifier (e.g., a Uniform Resource Locator (URL), a Uniform Resource Name (URN) etc.), an IP address, a memory or storage address, and the like. One of skill in the art will appreciate that any type of identifier may be employed by the various aspects disclosed herein without departing from the scope of this disclosure. Identifying the location of a resource may include parsing the resource identifier using, for example, regular expressions, providing one or more portions of the resource identifier to a search utility, executing the resource identifier, etc. In aspects, having access to the data collections does not guarantee access to the resources identified by the resource identifiers included in each data collection. For example, although a user may be able to access and manipulate Set 208, the user may not be authorized to access one or more of the underlying resources corresponding to the resource identifier in Set 208.

Resource providers 212 and 214 may be configured to store and/or provide access to one or more resources. As such, a resource provider as used herein may be a data store, a cloud service provider, a client computing device, a server computing device, a distributed system of devices, such as, for example, an enterprise network, an application, a software platform (e.g., an operating system, a database, etc.), and the like. In aspects, resource providers 212 and 214 may be (or have access to) various different data sources, such as content providers, data stores, various sets of application data, and the like. The data stores may comprise one or more resources corresponding to one or more resource identifiers. For example, as depicted in FIG. 2, resource provider 212 may be a data store comprising various different types of resources such as resource 228 (e.g., document 1 (D1)) and resource 230 (e.g., presentation 2 (P1)) and resource provider 214 may be a contact management application comprising contact resources 232 (e.g., contact 1 (C1)), 234 (e.g., contact 2 (C2)), 236 (e.g., contact 3 (C3)) and 238 (e.g., contact 4 (C4)). In this example, resource identifier 216 may correspond to resource 228; resource identifier 218 may correspond to resource 230; resource identifier 220 may correspond to resource 232; resource identifier 222 may correspond to resource 234; resource identifier 224 may correspond to resource 236; and resource identifier 226 may correspond to resource 238. In some aspects, resource providers 212 and 214 may be accessible by Set creation applications 202 and 204. Set creation applications 202 and 204 may access resource providers 212 and 214 to determine the existence of resources and/or retrieve information associated with the resources (e.g., resource metadata, resource location, resource identifiers, permission sets, authentication data, etc.). The information retrieved from resource providers 212 and 214 may be used to determine a set of resource identifiers corresponding to one or more of the available resources. The set of resource identifiers may be used to create one or more isolated collections of asserted resource identifiers and corresponding relationships. As noted above, the resource identifiers may be, or include, a durable URI for its corresponding resource. For instance, the resource identifier 216 may include the URI for the actual document (D1) 228. Accordingly, in such an example, a user is able to determine the location of the document (D1) 228 from the Set, and, depending on authentication and access restrictions, retrieve the document (D1) 228. As another example, as depicted in FIG. 2, resource provider 212 may be accessed by Set creation application 202. Set creation application 202 may determine that resource provider 212 comprises at least resources 228 and 230, and may determine resource identification information for each of the resources. Based on the determined resource identification information, resource identifiers 216 and 218 may be respectively applied/correlated to resources 228 and 230, and provided to environment 206. Environment 206 may then make resource identifiers 216 and 218 eligible for an inclusion analysis into one or more isolated collections.

Figure 3A:
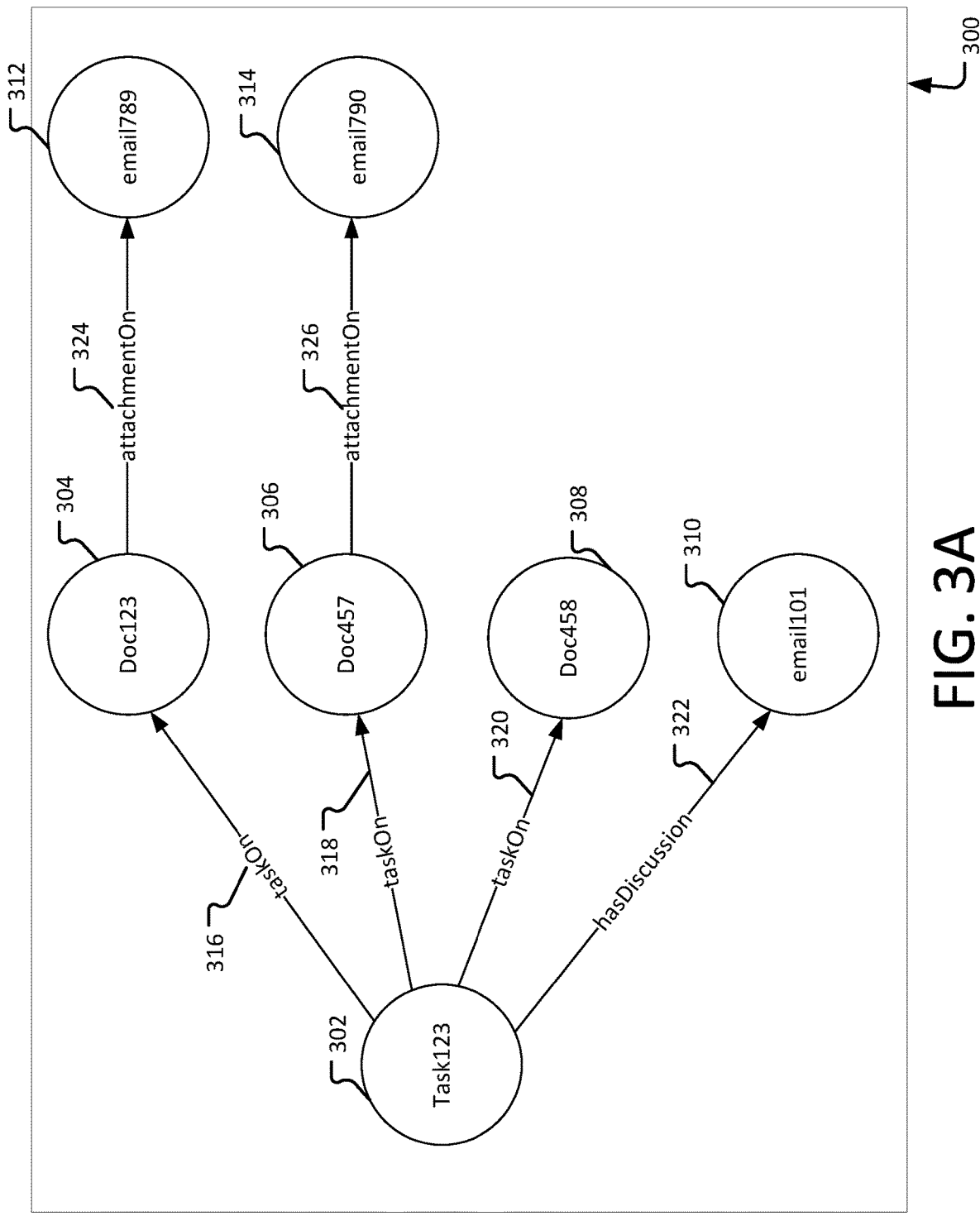
FIG. 3A illustrates an overview of an example isolated collection.

FIG. 3A illustrates an example isolated collection 300 of asserted resource identifiers and corresponding relationships. Example isolated collection 300 comprises resource identifiers 302, 304, 306, 308, 310, 312 and 314, and relationships 316, 318, 320, 322, 324 and 326. In aspects, isolated collection 300 may be generated and/or manipulated using a collection creation utility that may be included as part of a Set creation application as discussed above. When presented in graph form as depicted in the FIG. 3A, each resource identifier may be referred to as a "node" and each relationship may be referred to as an "edge." The collection creation utility may also identify resources and/or determine resource types for collections using one or more rulesets that may include rules defined in accordance with semantic web technologies, such as resource description framework (RDF), RDF schema (RDFS), SPARQL Protocol and RDF Query Language (SPARQL), Web Ontology Language (OWL), etc. For example, collection 300 includes a resource identifier 312 that represents an underlying resource, "email789" in the depicted example. Similarly, resource identifier 304 represents a resource document, "Doc123," and resource identifier 302 represents a resource task, "Task123." Each of the resources and relationships included in the isolated collection 300 may have been asserted by a developer through a Sets creation application. For instance, a developer may manually add each of the resource identifiers and the relationships between the resource identifiers. As an example, the developer may manually indicate that the "task123" is a task on "Doc123," as represented in the collection 300 by the "taskOn" relationship 316. The resource identifiers and relationships may also be asserted by an external bot or application created by a developer. For instance, an add-in may be programmed to monitor activity in a browser or other application to track usage of the application. Based on the usage of the application, the add-in sends additional resources and relationships to be included in the collection 300.

In contrast to the asserted resource identifiers and relationships, a collection creation utility may execute a ruleset to determine additional relationships and resource types, referred to herein as "inferred relationships" and "inferred resource identifiers" or "inferred resource types." For example, upon execution of a ruleset, the collection creation utility may determine that resource identifier 312 represents an email message, and resource identifier 304 represents a document. Generation of inferred relationships and resources is discussed in further detail below.

Isolated collection 300 further depicts that resource identifier 302 is associated with resource identifiers 304, 306 and 308 and resource identifier 310. The collection creation utility may determine that the resource identifier 302 represents a task to be performed on identifiers 304, 306, and 308. Based on this determination, the collection creation utility may assign relationships 316, 318 and 320 (e.g., "taskOn") to define the association between resource identifier 302 and resource identifier 304, 306 and 308. In other examples, the relationships 316, 318, and 320 may be asserted, as discussed above. Additional relationships, such as the "hasDiscussion" relationship 322 may have been asserted manually by a developer or asserted from an add-in of an e-mail application that analyzed the content of e-mail 101. While specific types of resources and relationships are described in FIG. 3A, one of skill in the art will appreciate that other types of resources and/or relationships may be included in an isolated collection without departing from the spirit of this disclosure.

Figure 3C:
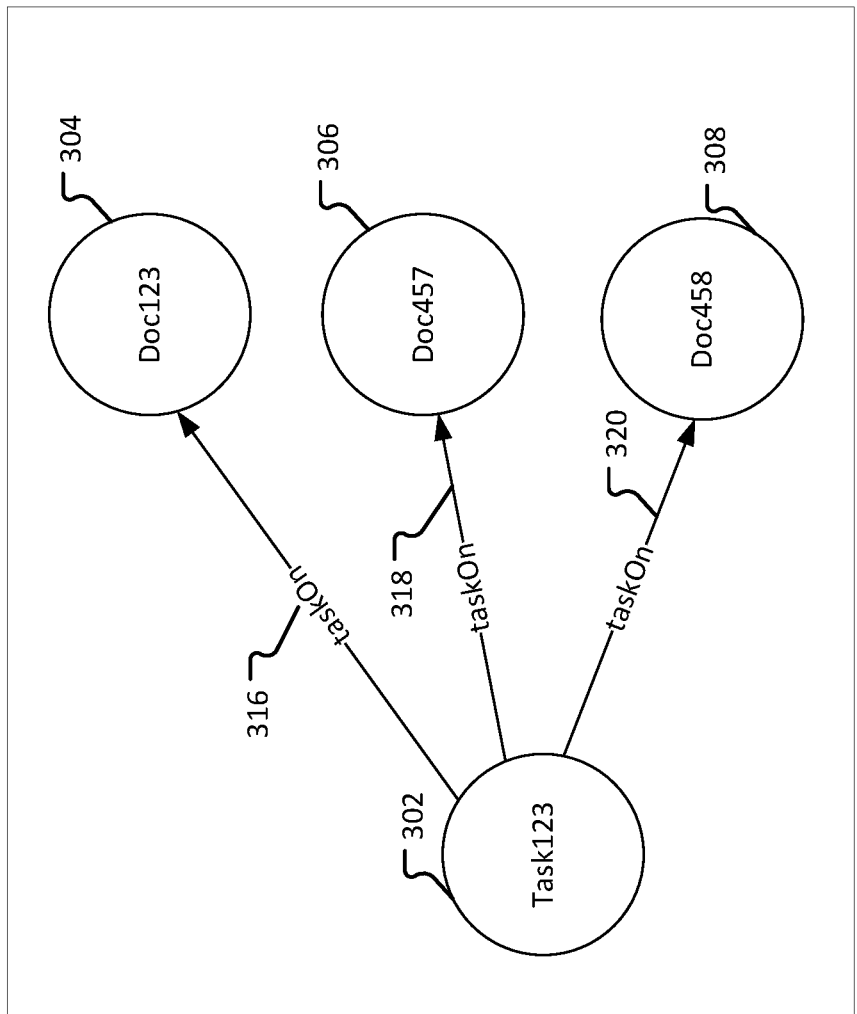
FIGS. 3B-3E illustrate an example query model that may be used to traverse an isolated collection.
Figure 3B:
Figure 3D:
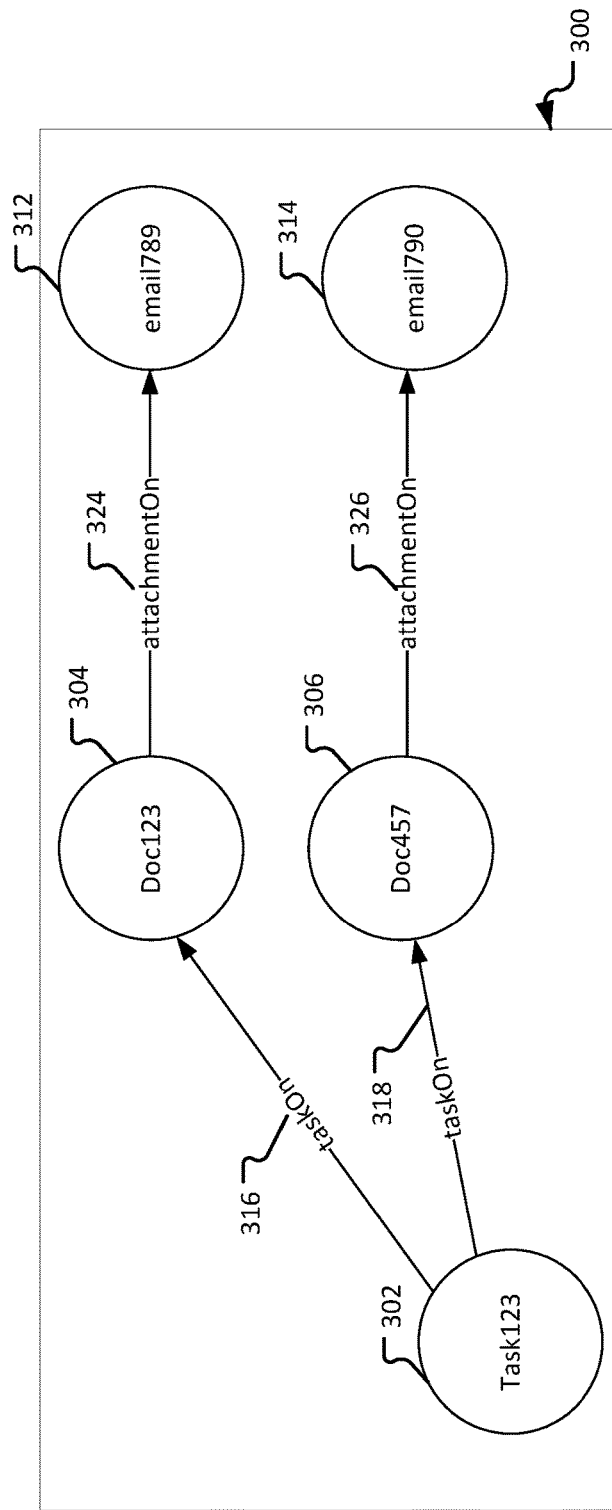
Figure 3E:
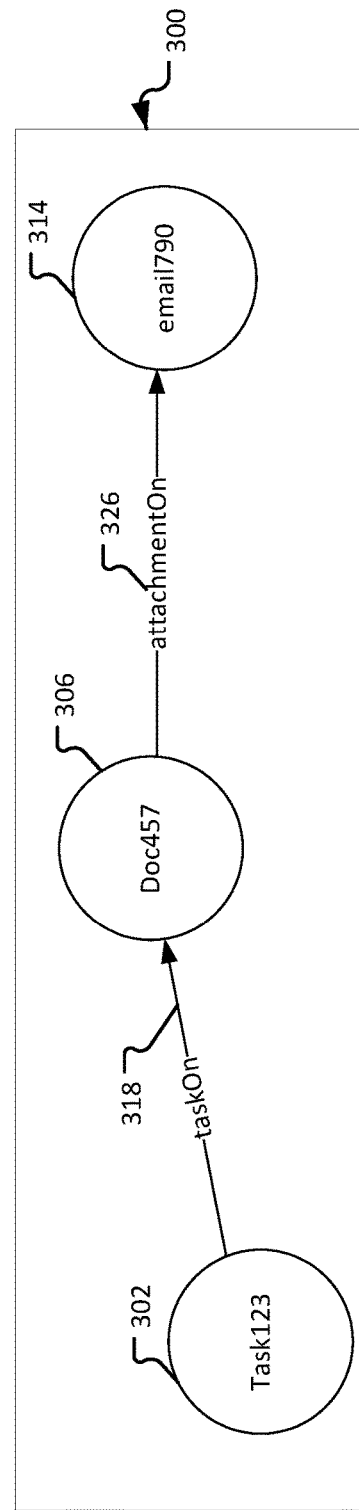

FIGS. 3B-3E illustrate an example query model that may be used to traverse collection 300. In aspects, queries may be executed via an interface provided by the collection creation utility. A query may be executed against one or more files and/or directories comprising information, such as resource identifiers, resource type, resource metadata, permission data, etc. The query results may be visualized in a graph form as one or more collections, such as collection 300. For example, the entire collection 300 dataset may comprise only those elements illustrated in collection 300 (e.g., resource identifiers 302, 304, 306, 308, 310, 312 and 314 and relationships 316, 318, 320, 322, 324 and 326). In this particular example, resource identifier 312 may represent an email comprising the subject "API Design" and resource identifier 314 may represent an email comprising the subject "Sets." The query 'http:// . . . /collection300/task123' may be executed against collection 300. The query results may comprise resource identifier 302 and be visualized as illustrated in FIG. 3B. In FIG. 3C, the query has been amended to 'http:// . . . /collection300/task123?$expand=taskOn' and executed against collection 300. The query results may comprise resource identifiers 302, 304, 306 and 308 and relationships 316, 318 and 320, and be visualized as illustrated in FIG. 3C. In FIG. 3D, the query has been amended to 'http:// . . . /collection300/task123?$expand=taskOn ($expand=attachmentOn)' and executed against collection 300. The query results may comprise resource identifiers 302, 304, 306, 308, 312 and 314 and relationships 316, 318, 320, 324 and 326, and be visualized as illustrated in FIG. 3D. In FIG. 3E, the query has been amended to http:// . . . /collection300/task123?($expand=taskOn ($expand=attachmentOn)($filter=Subject eq 'Sets'))' and executed against collection 300. As only resource identifier comprises 314 the subject "Sets", the query results may comprise resource identifiers 302, 306 and 314 and relationships 318 and 326, and be visualized as illustrated in FIG. 3E.

Figure 4:
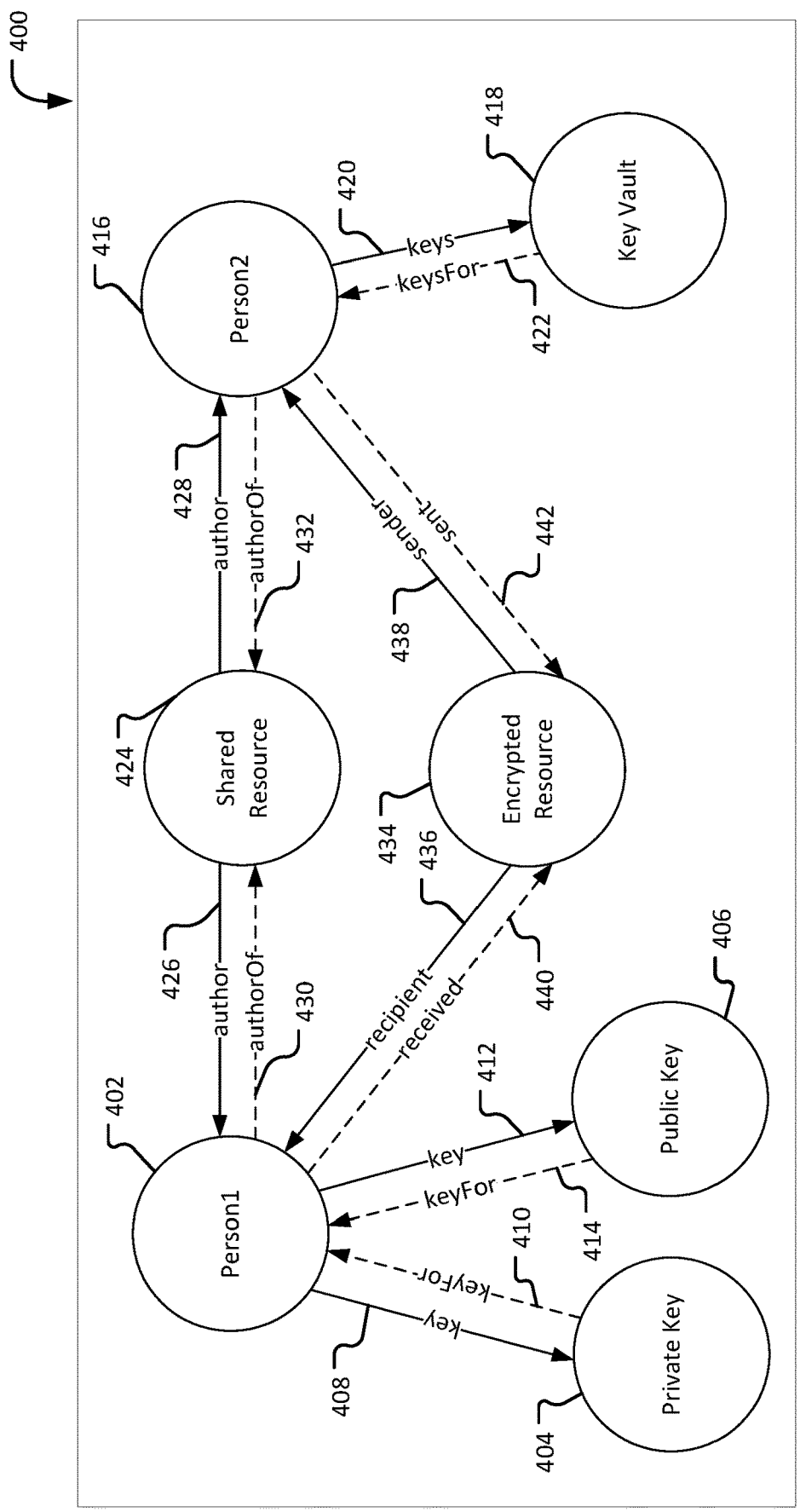
FIG. 4 illustrates an overview of an example isolated collection.

FIG. 4 illustrates an overview of an example isolated collection 400. Isolated collection 400 may be comprised of Person1 402 and Person 2 416, which may be user resources as described herein. Private Key 404 and Public Key 406 may be associated with Person1 402 by way of relationships 408-14. In some examples, Private Key 404 and Public Key 406 may be key identifiers, wherein the actual cryptographic keys may be stored in a key vault or other data store (not pictured). Private Key 404 and Public Key 406 may have been provided by Person1 402 when Person1 402 first gained access to isolated collection 400. In another example, Private Key 404 and Public Key 406 may have been automatically generated. Relationships 408 and 412 use solid arrows to indicate that asserted relationships of "key" exist between Person1 402 and Private Key 404, and Person1 402 and Public Key 406, respectively. Relationships 408 and 412 are directional, in that they indicate that Private Key 404 and Public Key 406 are both keys for Person1 402, rather than the other way around. Similarly, relationships 410 and 414 use dashed arrows to indicate that inferred relationships of "keyFor" exist between Private Key 404 and Person1 402, and Public Key 406 and Person1 402, respectively. Relationships 410 and 414 are directional, in that they indicate that Private Key 404 is a key for Person1 402 and that Public Key 406 is a key for Person1 402, rather than the other way around.

Similarly, Key Vault 418 may be associated with Person2 416 by way of relationships 420 and 422. Key Vault 418 may be a key vault as described herein and may be used to store cryptographic keys associated with Person2 416. In some examples, Key Vault 418 may store public and private keys, only public keys, asymmetric keys, symmetric keys, encrypted or unencrypted keys, or any combination thereof. In one example, Key Vault 418 may be stored in isolated collection 400, while in other examples Key Vault 418 may be a resource identifier associated with a key vault that is stored elsewhere (e.g., in a data store, a hardware security module, etc.). The keys stored by Key Vault 418 may have been provided by Person2 416 when Person2 416 first gained access to isolated collection 400. In another example, the keys may have been automatically generated. A combination of provided keys and generated keys may be stored by Key Vault 418. Relationship 420 uses a solid arrow to indicate that an asserted relationship of "keys" exists between Person2 416 and Key Vault 418. Relationship 420 is directional, in that it indicates that Key Vault 418 stores keys for Person2 416, rather than the other way around. Similarly, relationship 422 uses a dashed arrow to indicate that an inferred relationship of "keysFor" exists between Key Vault 418 and Person2 416. Relationship 422 is directional, in that it indicates that Key Vault 418 is a key vault for Person2 416, rather than the other way around.

Person1 402 and Person2 416 may each be an author of Shared Resource 424. This may be indicated by relationships 426 and 428, which are asserted directional "author" relationships, as shown by the solid directional arrows between Shared Resource 424 and Person1 402, and between Shared Resource 424 and Person2 416, respectively. Conversely, "authorOf" relationships 430 and 432 are inferred relationships, as indicated by the dashed lines between Person1 402 and Shared Resource 424, and Person2 416 and Shared Resource 424, respectively. While specific relationships between the user resources 402 and 416 and the shared resource 424 have been described herein, one of skill in the art will appreciate that other types of relationships between the resources may exist without departing from the spirit of this disclosure. For example, other exemplary relationships include, but are not limited to, "ownerOf," "senderOf," "editorOf," etc. Shared Resource 424 may be a resource as described herein and may be available to other users of isolated collection 400. As such, Shared Resource 424 may be signed by Person1 402 and/or Person2 416, thereby enabling other users to verify the state of the resource as of when it was signed. Signature verification may be performed by identifying cryptographic keys (e.g. public keys) associated with Person1 402 and/or Person2 416 (e.g., Public Key 406 and a public key stored by Key Vault 418, respectively). Shared Resource 424 and its signatures may then be verified based on the identified cryptographic keys.

By contrast, Encrypted Resource 434 may be an encrypted communication or other resource communicated between Person1 402 and Person2 416. As pictured, Person2 416 sent Encrypted Resource 434 to Person1 402. This is indicated by relationship 438, which is an asserted directional "sender" relationship between Encrypted Resource 434 and Person2 416. Conversely, relationship 442 is a directional inferred "sent" relationship that indicates that Person2 416 sent Encrypted Resource 434. Similarly, asserted directional "recipient" relationship 436 indicates that the recipient of Encrypted Resource 434 is Person1 402. Conversely, directional inferred "received" relationship 440 indicates that Person1 402 received Encrypted Resource 434. Person2 416 may have signed Encrypted Resource 434 using a private key (e.g., a key stored in Key Vault 418, or at least associated with a public key stored in Key Vault 418), after which Person2 416 may have identified a cryptographic key associated with the recipient, Person1 402. Person 2 may have used the identified cryptographic key (e.g., Public Key 406) to encrypt Encrypted Resource 434.

Person1 402 may generate a decrypted representation of Encrypted Resource 434 using Private Key 404, which is the private key of the key pair comprising Public Key 406. After decrypting Encrypted Resource 434, Person1 402 may determine that Person2 416 was the sender by examining the relationships associated with Encrypted Resource 434 (e.g., based on relationship 438). As a result, Person1 402 may identify a cryptographic key associated with Person2 416. In some examples, the cryptographic key may be a public key stored in Key Vault 418, which Person1 402 may use to verify the signature of the unencrypted representation of Encrypted Resource 434.

Figure 5A:
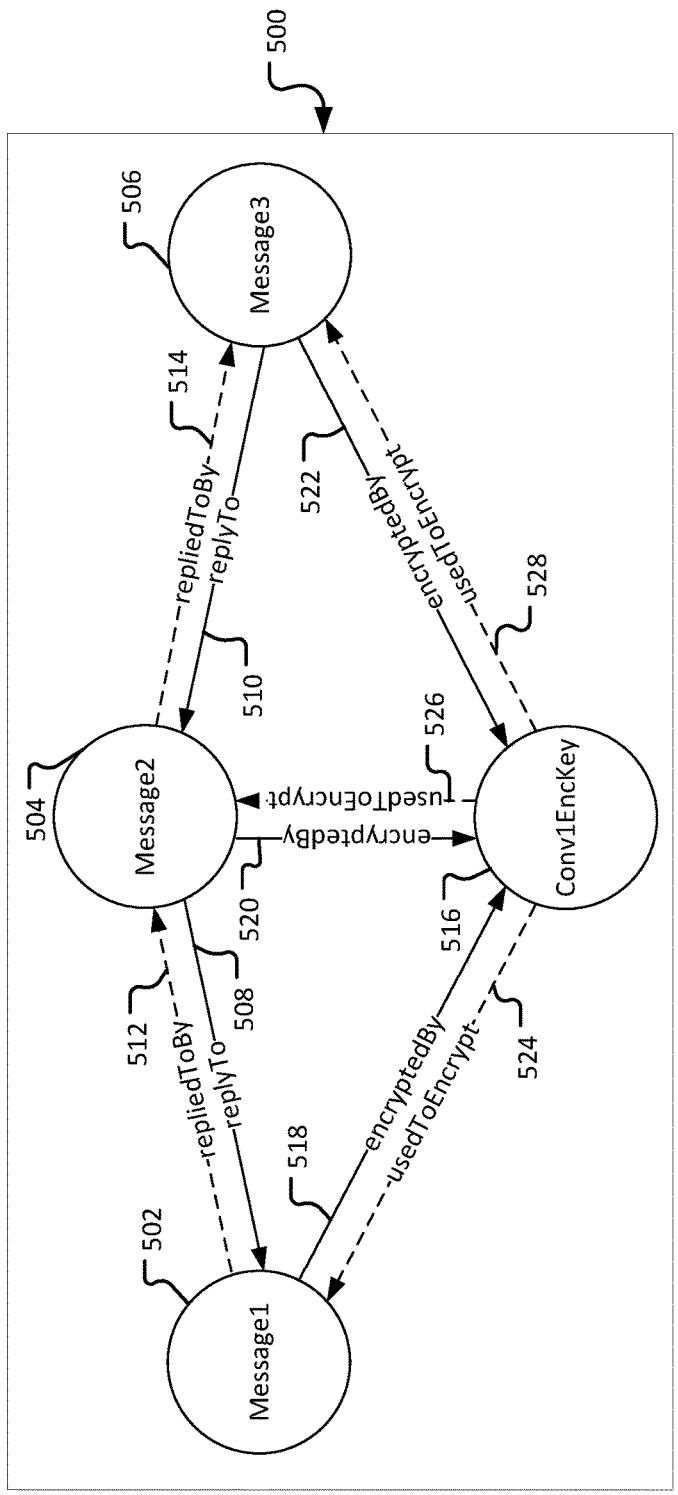
FIG. 5A illustrates an overview of an example encrypted conversation stored in an isolated collection.

FIG. 5A illustrates an overview of an example encrypted conversation stored in an isolated collection 500. Isolated collection 500 is comprised of Message1 502, Message2 504, and Message3 506. Message1 502, Message2 504, and Message3 506 may be messages (or references to messages) that were communicated during a conversation session as disclosed herein. Relationships 508 and 510 use solid arrows to indicate that asserted relationships of "replyTo" exist between Message2 504 and Message1 502, and Message3 506 and Message2 504, respectively. Relationships 508 and 510 are directional, in that they indicate that Message2 was a reply to Message1 and that Message3 was a reply to Message2, rather than the other way around. Similarly, relationships 512 and 514 use dashed arrows to indicate that inferred relationships of "repliedToBy" exist between Message1 502 and Message2 504, and Message2 504 and Message3 506, respectively. Relationships 512 and 514 are directional, in that they indicate that Message1 502 was replied to by Message2 504 and that Message2 504 was replied to by Message3 506, rather than the other way around.

Isolated collection 500 also comprises Conv1EncKey 516, which may be a cryptographic key (or a reference to a cryptographic key) used to encrypt messages communicated during the conversation session. More specifically, Conv1EncKey 516 may have been generated when the conversation session was initialized and used to encrypt Message1 502, Message2 504, and Message3 506. Accordingly, relationships 518, 520, and 522 use solid arrows to indicate that asserted relationships of "encryptedBy" exist between Message1 502 and Conv1EncKey 516, Message2 504 and Conv1EncKey 516, and Message3 506 and Conv1EncKey 516, respectively. As such, relationships 518, 520, and 522 indicate that Message1 502, Message2 504, and Message3 506 are each encrypted by Conv1EncKey 516. Further, relationships 524, 526, and 528 use dashed arrows to indicate that inferred relationships of "usedToEncrypt" exist between Conv1EncKey 516 and Message1 502, Conv1EncKey 516 and Message2 504, and Conv1EncKey 516 and Message 506, respectively. As a result, it may be possible to determine that Conv1EncKey 516 was used to encrypt Message1 502, Message2 504, and Message3 506.

Figure 5C:
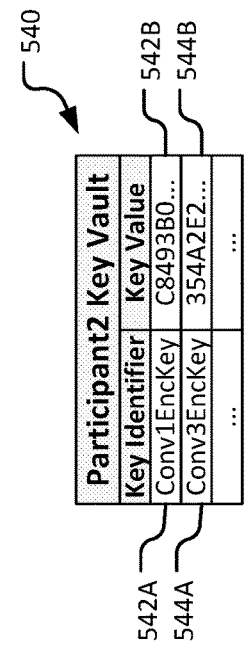
FIGS. 5B-5C illustrate an overview of example key vaults associated with an encrypted conversation.
Figure 5B:
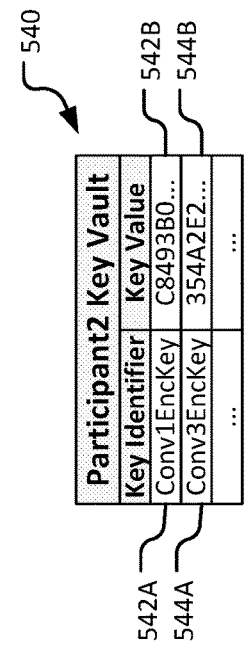

FIG. 5B illustrates an overview of an example key vault 530 associated with an encrypted conversation session, such as the conversation session stored in isolated collection 500 as discussed above with respect to FIG. 5A. As discussed above, key vault 530 may be associated with a user (e.g., "Participant1") and stored within an isolated collection. Key vault 530 may be comprised of one or more key entries, wherein each key entry may be comprised of a key identifier and a key value. As discussed above, a key identifier may be may be a key fingerprint, a hash of the key or information relating to the key (e.g., MD5, SHA-1, etc.), or an identifier (e.g., a GUID, a URI, etc.), among others. The key value may be the data relating to the cryptographic key stored by the key vault.

Key vault 530 may be comprised of a first key entry 532A-B and a second key entry 534A-B. The first key entry comprises a key identifier Conv1EncKey 532A and a key value 532B. Similarly, the second key entry comprises a key identifier Conv2EncKey 534A and a key value 534B. In some examples, example key vault 530 may be indexed according to key identifiers 532A and 534A, such that it may be possible to search for the associated key values (e.g., key values 532B and 534B) using a key identifier (e.g., "Conv1EncKey" or "Conv2EncKey").

FIG. 5C illustrates an overview of an example key vault 540 associated with an encrypted conversation session, such as the conversation session stored in isolated collection 500 as discussed above with respect to FIG. 5A. As discussed herein, key vault 540 may be associated with a user (e.g., "Participant2") and stored within an isolated collection. In some examples, key vault 540 may be Key Vault 418 associated with Person2 416 as illustrated in FIG. 4. Key vault 540 may be comprised of one or more key entries, wherein each key entry may be comprised of a key identifier and a key value. As discussed above, a key identifier may be may be a key fingerprint, a hash of the key or information relating to the key (e.g., MD5, SHA-1, etc.), or an identifier (e.g., a GUID, a URI, etc.), among others. The key value may be the data relating to the cryptographic key stored by the key vault.

Key vault 540 may be comprised of a first key entry 542A-B and a second key entry 544A-B. The first key entry comprises a key identifier Conv1EncKey 542A and a key value 542B. Similarly, the second key entry comprises a key identifier Conv3EncKey 544A and a key value 544B. In some examples, example key vault 540 may be indexed according to key identifiers 542A and 544A, such that it may be possible to search for the associated key values (e.g., key values 542B and 544B) using a key identifier (e.g., "Conv1EncKey" or "Conv3EncKey").

With reference to FIGS. 5A-5C, a conversation participant (e.g., "Participant1" or "Participant2") may wish to access messages stored by isolated collection 500 (e.g., Message1 502, Message2 504, and/or Message3 506). At least one of the conversations messages may be accessed and used to determine which cryptographic key is required to decrypt the conversation messages. In an example, the appropriate cryptographic key may be determined by evaluating at least one of relationships 518, 520, or 522 to determine that Conv1EncKey 516 should be used to decrypt the conversation messages. As a result, a determination may be made as to whether Conv1EncKey 516 is accessible to decrypt the conversation messages. In some examples, key vault 530 or key vault 540 may be accessed to determine whether an identifier matching that of Conv1EncKey 516 is present. If it is determined that the conversation participant has access to a cryptographic key associated with the key identifier "Conv1EncKey" (e.g., key identifiers 532A or 542A for Participant1 or Participant2, respectively), the key value (e.g., key values 532B or 542B, respectively) may be decrypted using the participant's private key. The decrypted key may then be used to decrypt the messages stored in isolated collection 500.

By contrast, if it is determined that the cryptographic key associated with the key identifier "Conv1EncKey" was unavailable, a request may be provided to Participant1 and/or Participant2. If either current participant grants the access request, the current participant's key having an identifier of "Conv1EncKey" may be decrypted using the current participant's private key, after which it may be re-encrypted using the requestor's public key. The re-encrypted cryptographic key may then be provided to the requestor. The requestor may decrypt the received key as described above in order to access the conversation session stored by isolated collection 500.

Figure 6:
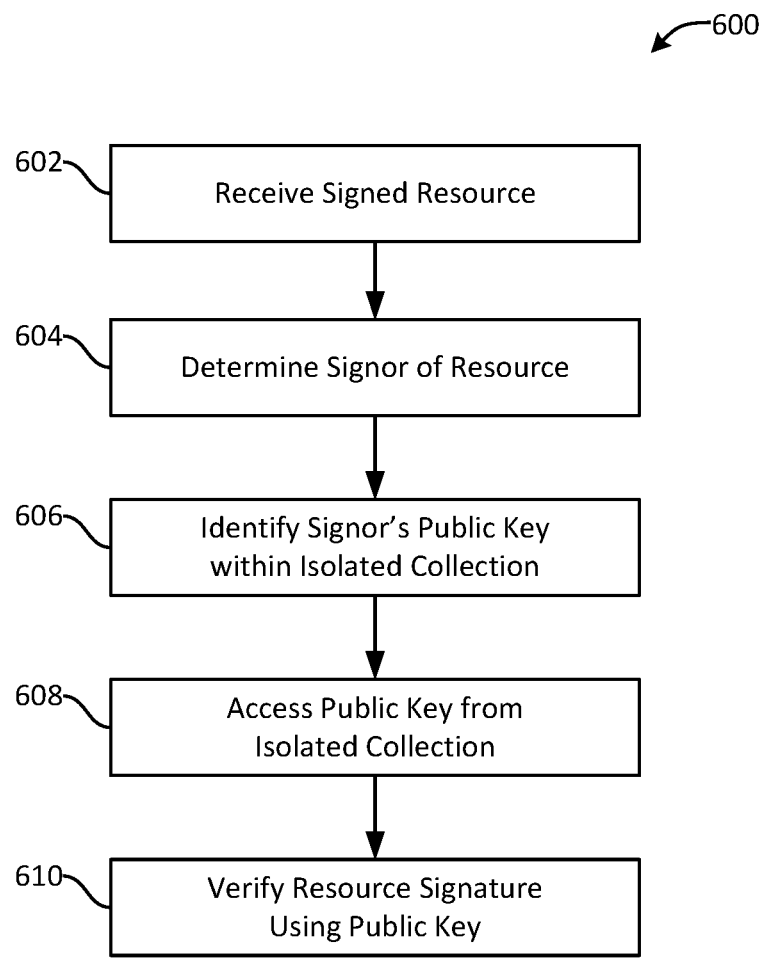
FIG. 6 illustrates an overview of an example method for verifying a signature within an isolated collection.

FIG. 6 illustrates an overview of an example method 600 for verifying a signature within an isolated collection. Method 600 begins at operation 602, where a signed resource may be received. The signed resource may be Shared Resource 424 as pictured in FIG. 4. The signed resource may have been received as a result of an indication provided by a user, such as Person1 402 or Person2 416. The signed resource may be stored within an isolated collection, such as isolated collection 400. In some examples, method 600 may occur automatically when the signed resource is accessed.

Moving to operation 604, a signer may be determined for the resource. Determining the signer may comprise evaluating one or more relationships associated with the signed resource to identify a user resource associated with the signer. In some examples, metadata or properties associated or stored with the signed resource may provide an indication that may be used in the determination. After a signer is identified, flow moves to operation 606, where a public key associated with the signer may be identified within the isolated collection. Identifying the public key may comprise accessing the user resource associated with the signer to evaluate one or more relationships of the user resource. In some examples, the user resource may have a "key" or "keys" relationship (or similar association) with a resource comprising a key vault, cryptographic key, or cryptographic key identifier. In another example, there may be multiple relationships and identifying a public key may comprise evaluating a plurality of cryptographic keys. In one example, the signed resource may comprise metadata or properties that may provide an indication as to a specific cryptographic key which may be used in the identification.

At operation 608, the public key may be accessed from the isolated collection. Accessing the public key may comprise retrieving the public key from the cryptographic key resource associated with the signer's user resource, as identified in operation 606. In another example, the cryptographic key resource may comprise an identifier which may be used to access the public key in a key vault or other data store. Moving to operation 610, the signature of the signed resource may be verified using the public key. In some examples, the result of the verification may be indicated using at least one of a variety of indicators (e.g., visual, auditory, electronic, etc.). In one example, an option may be presented in response to the result of the verification (e.g., an option to proceed even though verification failed or was not completed, an option to disregard the signed resource, etc.). Flow terminates at operation 610.

Figure 7:
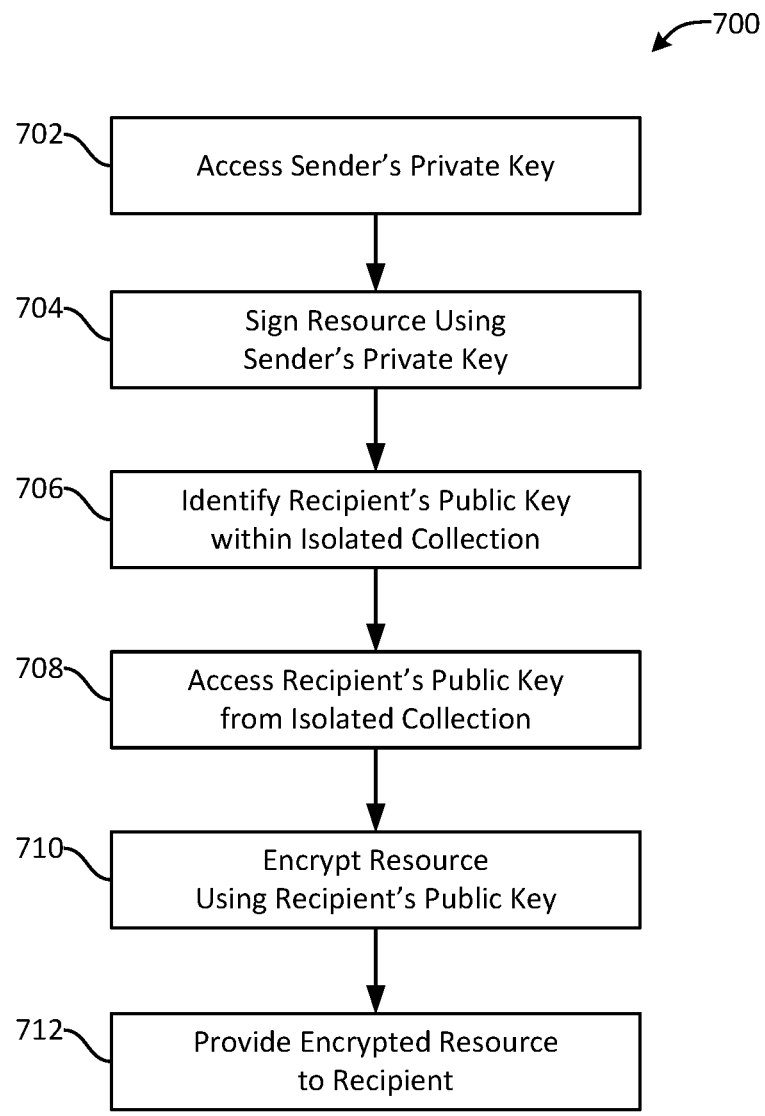
FIG. 7 illustrates an overview of an example method for encrypting a resource within an isolated collection.

FIG. 7 illustrates an overview of an example method 700 for encrypting a resource within an isolated collection. In an example, the resource (e.g., Encrypted Resource 434 in FIG. 4) may be encrypted by a sender, such as Person2 416, and received by a recipient, such as Person1 402. Method 700 begins at operation 702, where a sender's private key may be accessed. In some examples, the sender's private key may be accessed from an isolated collection (e.g., the same isolated collection that stores the resource to be encrypted), wherein access to the private key is restricted. In other examples, the private key may be stored elsewhere, such as a private data store or a cryptographic hardware device, among others. In another example, the private key may not be directly accessed, and the resource may instead be provided to another component for signature (e.g., a key vault or a cryptographic hardware device, among others).

At operation 704, the resource may be signed using the sender's private key. Signing the resource may comprise storing or associating additional information with the resource related to the cryptographic signature (e.g., as metadata, properties, etc.). In some examples, one or more relationships may be formed between the resource and a user resource associated with the sender. Moving to operation 706, a public key associated with a recipient may be identified within the isolated collection. Identifying the public key may comprise accessing a user resource associated with the recipient to evaluate one or more relationships of the user resource. In some examples, the user resource may have a "key" or "keys" relationship (or similar association) with a resource comprising a key vault, cryptographic key, or cryptographic key identifier. In another example, there may be multiple relationships or keys, and identifying a public key may comprise evaluating a plurality of cryptographic keys, based on, for example, the type of data to be encrypted, the identity of the sender or recipient, or the relationship between the sender and recipient, among others.

At operation 708, the public key identified in operation 706 may be accessed from the isolated collection. Accessing the public key may comprise retrieving the public key from the cryptographic key resource associated with the recipient's user resource, as identified in operation 706. In another example, the cryptographic key resource may comprise an identifier which may be used to access the public key in a key vault or other data store.

At operation 710, the resource may be encrypted using the recipient's public key that was accessed at operation 708. Encrypting the resource may comprise embedding or associating metadata or properties that may be helpful in determining a cryptographic key when decrypting the resource. Moving to operation 712, the encrypted resource may be provided to the recipient. Providing the resource may comprise storing the resource in the isolated collection and generating one or more relationships between the encrypted resource and other resources in the isolated collection. As an example, a relationship may be generated between the encrypted resource and the sender, as well as between the encrypted resource and the recipient. The recipient may receive an indication that the resource is available in the isolated collection. In another example, the encrypted resource or a resource identifier associated with the encrypted resource may be provided to the recipient. Flow terminates at operation 712.

Figure 8:
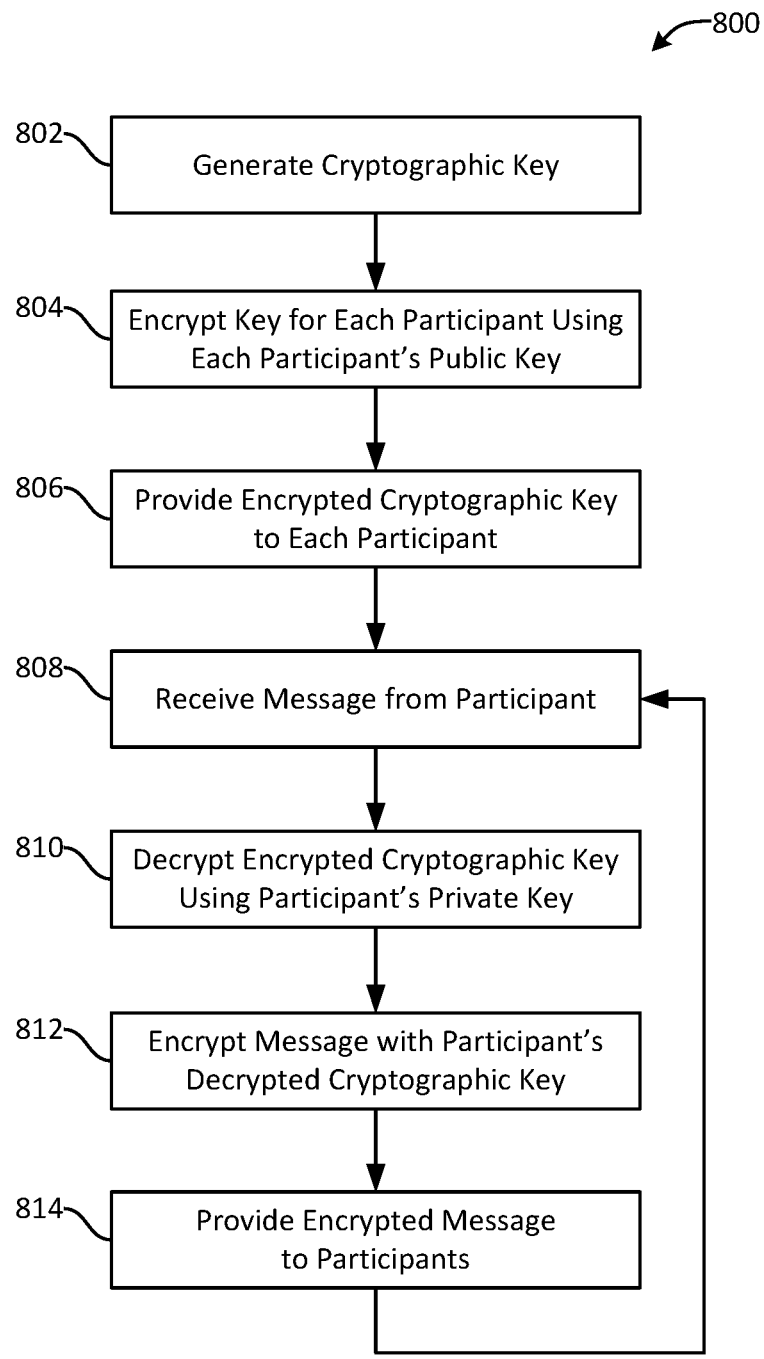
FIG. 8 illustrates an overview of an example method for encrypted group communication among participants within an isolated collection.

FIG. 8 illustrates an overview of an example method 800 for encrypted group communication among participants within an isolated collection. As an example, the conversation stored by isolated collection 500 as illustrated in FIG. 5 may have been created by performing operations similar to those of method 800. Method 800 begins at operation 802, where a cryptographic key may be generated. As discussed above, the cryptographic key may be an asymmetric key pair or a symmetric key, among others. The cryptographic key may be generated when a conversation session is initiated. In some examples, the cryptographic key may be generated during an ongoing conversation session (e.g., in response to an event) in order to rotate the cryptographic key used for the conversation session. In one example, an identifier associated with the cryptographic key may be stored in the isolated collection such that a relationship may be formed between it and messages that are encrypted using the cryptographic key. This may provide participants an indication as to which cryptographic key is required to decrypt a message that was sent during the conversation session.

Moving to operation 804, the cryptographic key that was generated in operation 802 may be encrypted for each participant using each participant's public key. In some examples, for each participant, identifying the public key may comprise accessing a user resource associated with the participant to evaluate one or more relationships of the user resource. The user resource may have a "key" or "keys" relationship (or similar association) with a resource comprising a key vault, cryptographic key, or cryptographic key identifier. In another example, there may be multiple relationships or keys, and identifying a public key may comprise evaluating a plurality of keys, based on, for example, the type of data to be encrypted, the identity of the sender or recipient, or the relationship between the sender and recipient, among others. The cryptographic key may then be encrypted for each participant using the determined public key of each participant.

At operation 806, the encrypted cryptographic keys may be provided to each participant. Providing the cryptographic keys may comprise storing each cryptographic key in a key vault associated with the participant. In one example, an indication may be provided to each participant to indicate the location of the cryptographic key. In another example, the cryptographic keys may be transmitted to each participant. One of skill in the art will appreciate that any method of delivering the cryptographic keys may be used without departing from the spirit of this disclosure.

Moving to operation 808, a message may be received from a participant. The message may comprise any type of data including, but not limited to, text data, image or video data, audio data, or any combination thereof. The message may be received from a computing device of the participant (e.g., a mobile computing device, a tablet computing device, a personal computing device, etc.). In some examples, the message may be received from client devices 102A-C in FIG. 1.

At operation 810, the participant's encrypted cryptographic key may be decrypted using the participant's private key. In some examples, the private key may be stored in a key vault, in an isolated collection, or using a cryptographic hardware device, among others. Similarly, the encrypted cryptographic key may be stored in a key vault, in an isolated collection etc. The cryptographic key and the private key may be stored in similar or different locations. In some examples, the decrypted cryptographic key may be cached such that it need not be continually decrypted during the conversation session.

Moving to operation 812, the message may be encrypted with the decrypted cryptographic key. In some examples, the message may be signed before or after the encryption operation is performed. The message may be signed using the participant's private key, such that other conversation participants may verify the signature using the public key associated with the private key, which may be associated with a user resource that is associated with the participant.

At operation 814, the encrypted message may be provided to the conversation participants. Providing the encrypted message may comprise storing the message (e.g., as a resource in the isolated collection) or a reference to the message (e.g., as a resource comprising a resource identifier in the isolated collection). A relationship may be formed between the message and the key identifier of the cryptographic key within the isolated collection. In one example, the participants may receive an indication that a new message is available in the isolated collection or the participants may periodically poll the isolated collection to determine whether there is a new message. In another example, the encrypted message may be transmitted to the conversation participants. Flow may loop through operations 808-814 for the duration of the conversation session, as the conversation participants continue to communicate among one another. In some examples, a conversation participant may be added to the conversation, as discussed in greater detail below with respect to FIG. 9.

Figure 9:
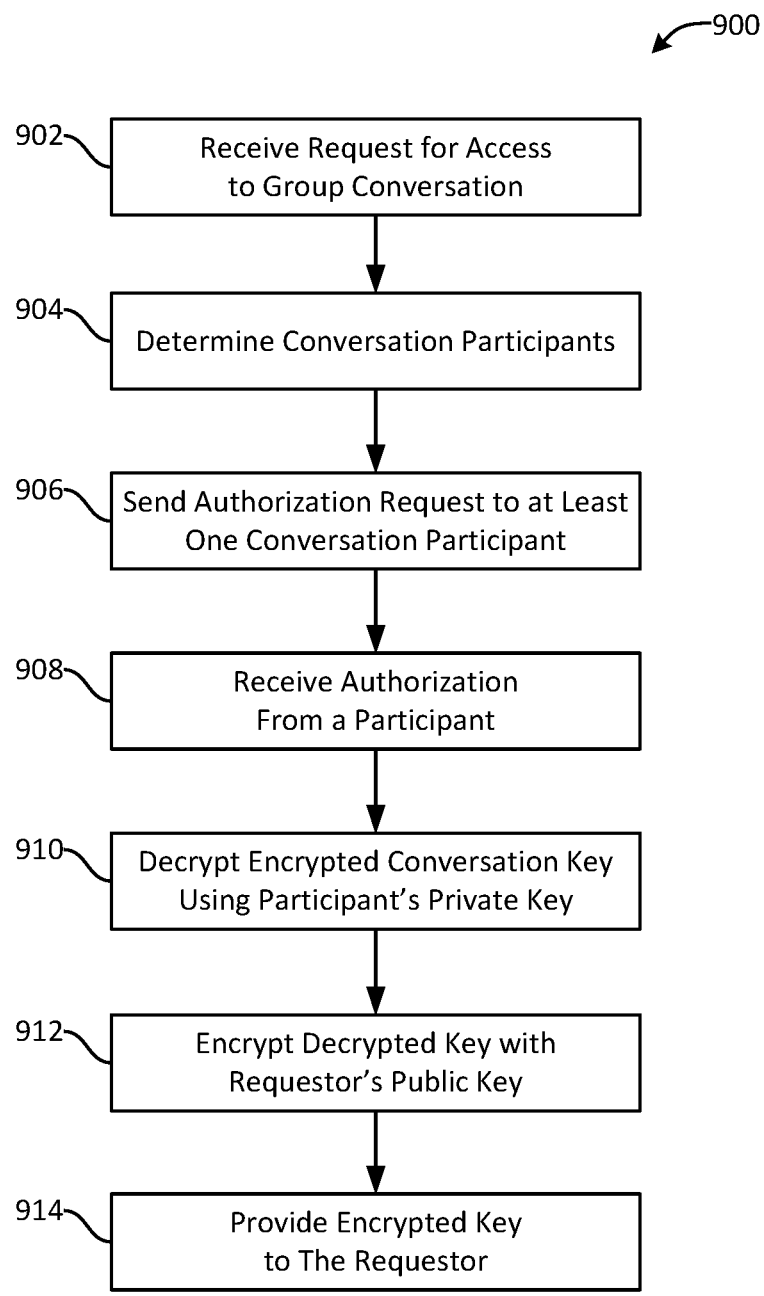
FIG. 9 illustrates an overview of an example method for gaining access to a group conversation session by a new participant.

FIG. 9 illustrates an overview of an example method 900 for gaining access to a group conversation session by a new participant. Method 900 begins at operation 902, where a request for access to a group conversation may be received. The request may be received from a computing device of a potential participant requesting access to the conversation (e.g., a mobile computing device, a tablet computing device, a personal computing device, etc.). In some examples, the message may be received from client devices 102A-C in FIG. 1.

At operation 904, current participants of the conversation session may be determined. The determination may be made based on relationships that exist between messages of the conversation and one or more user resources (e.g., a "sender" or "recipient" relationship may exist between messages and user resources stored within an isolated collection). In one example, a participant list or other data structure may be associated with the conversation such that it may be evaluated in order to determine the conversation participants. In another example, relationships may exist between a key identifier associated with the cryptographic key used to encrypt the conversation session and user resources associated with the conversation participants. As a result, the relationships of the key identifier may be evaluated to determine one or more user resources associated with the conversation participants.

Moving to operation 906, an authorization request may be sent to one or more of the determined conversation participants. The authorization request may comprise a variety of information, including, but not limited to, context surrounding the conversation, identity information relating to the requestor, or information relating to the current list of conversation participants. The participant may authorize or reject the request. In some examples, the participant may provide an earlier indication that may be used when responding to authorization requests. As an example, the participant may specify that such requests should be automatically accepted, rejected, or ignored, among others. In another example, the participant may create one or more rules that may be evaluated when responding to an authorization request.

At operation 908, authorization may be received from a participant. The authorization may comprise an indication that the requestor may be added to the conversation. In one example, the indication may comprise one or more requirements relating to how the cryptographic key associated with the conversation must be stored (e.g., the encryption strength or cryptographic algorithm that must be used, among others).

Moving to operation 910, the cryptographic key associated with the conversation may be decrypted using the participant's private key. In some examples, the decrypted cryptographic key may have been provided by the participant when the authorization indication was provided. In another example, the participant's private key may be retrieved from a location indicated by the participant, such as a key vault or data store, among others. In one example, the cryptographic key may be provided to another component (e.g., a key vault, a cryptographic hardware device, etc.), which may use the participant's private key to provide a decrypted cryptographic key in response.

At operation 912, the decrypted cryptographic key may be encrypted using the requestor's public key. Encrypting the key using the requestor's public key may comprise identifying a public key by accessing a user resource associated with the requestor to evaluate one or more relationships of the user resource. In some examples, the user resource may have a "key" or "keys" relationship (or similar association) with a resource comprising a key vault, cryptographic key, or cryptographic key identifier. In another example, there may be multiple relationships or keys, and identifying a public key may comprise evaluating a plurality of cryptographic keys, based on, for example, the type of data to be encrypted, the identity of the requestor or other conversation participants, or requirements provided by the authorizing participant, among others.

Moving to operation 914, the encrypted key may be provided to the requestor. Providing the cryptographic key may comprise storing the cryptographic key in a key vault associated with the requestor. In one example, an indication may be provided to the requestor that indicates the location of the cryptographic key. In another example, the cryptographic key may be transmitted to the requestor. The requestor may then use the cryptographic key to access and participate in the group conversation (e.g., by performing operations 808-814 in FIG. 8). Flow terminates at operation 914.

FIGS. 10-13 and the associated descriptions provide a discussion of a variety of operating environments in which aspects of the disclosure may be practiced. However, the devices and systems illustrated and discussed with respect to FIGS. 10-13 are for purposes of example and illustration and are not limiting of a vast number of computing device configurations that may be utilized for practicing aspects of the disclosure, described herein.

Figure 10:
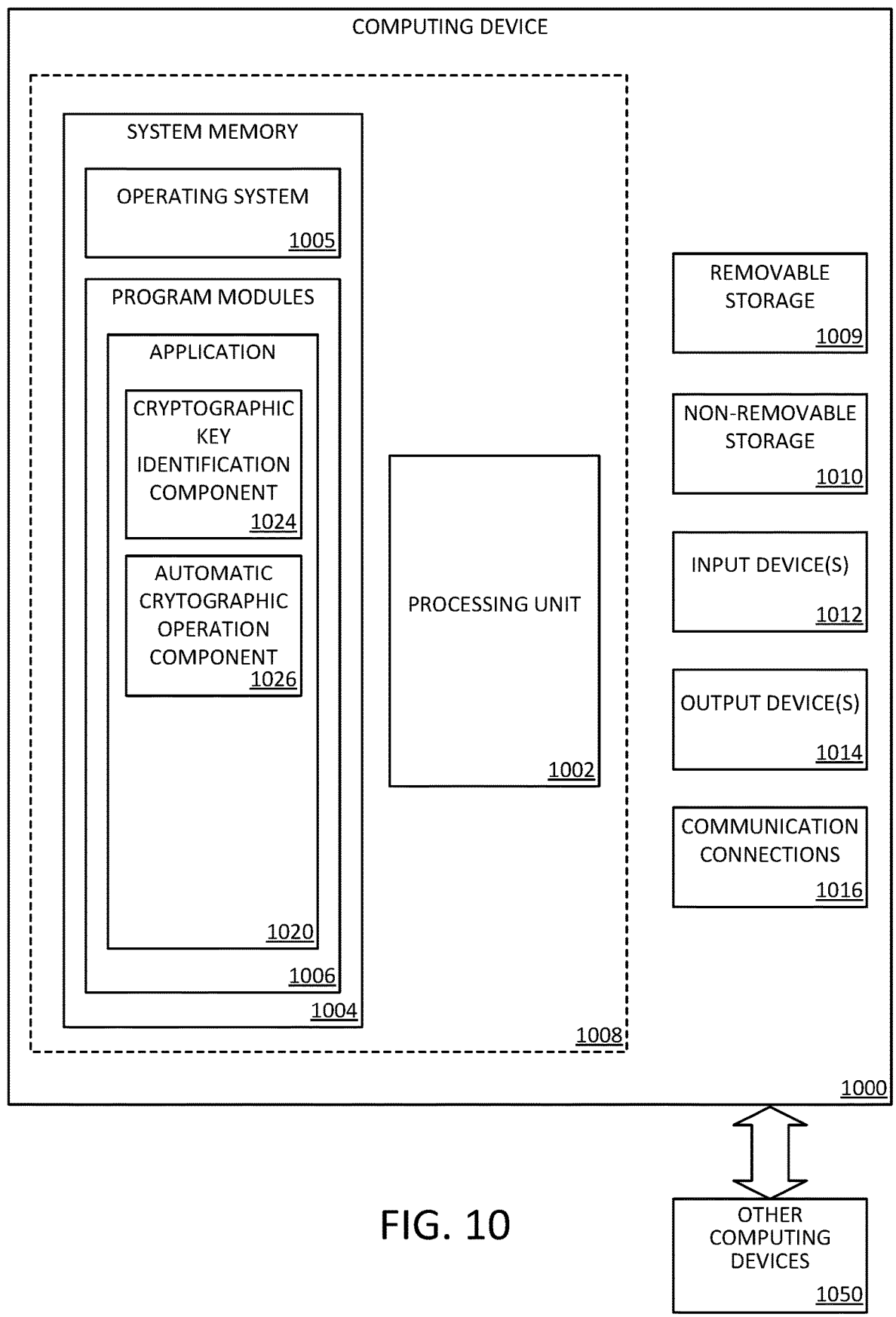
FIG. 10 is a block diagram illustrating example physical components of a computing device with which aspects of the disclosure may be practiced.

FIG. 10 is a block diagram illustrating physical components (e.g., hardware) of a computing device 1000 with which aspects of the disclosure may be practiced. The computing device components described below may be suitable for the computing devices described above, including the client computing devices 102A-C and the server computing devices 106A-C. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories. The system memory 1004 may include an operating system 1005 and one or more program modules 1006 suitable for performing the various aspects disclosed herein such as a cryptographic key identification component 1024 and an automatic cryptographic operation component 1026. The operating system 1005, for example, may be suitable for controlling the operation of the computing device 1000. Furthermore, embodiments of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 (e.g., application 1020) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 1000 may include one or more communication connections 1016 allowing communications with other computing devices 1050. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11A:
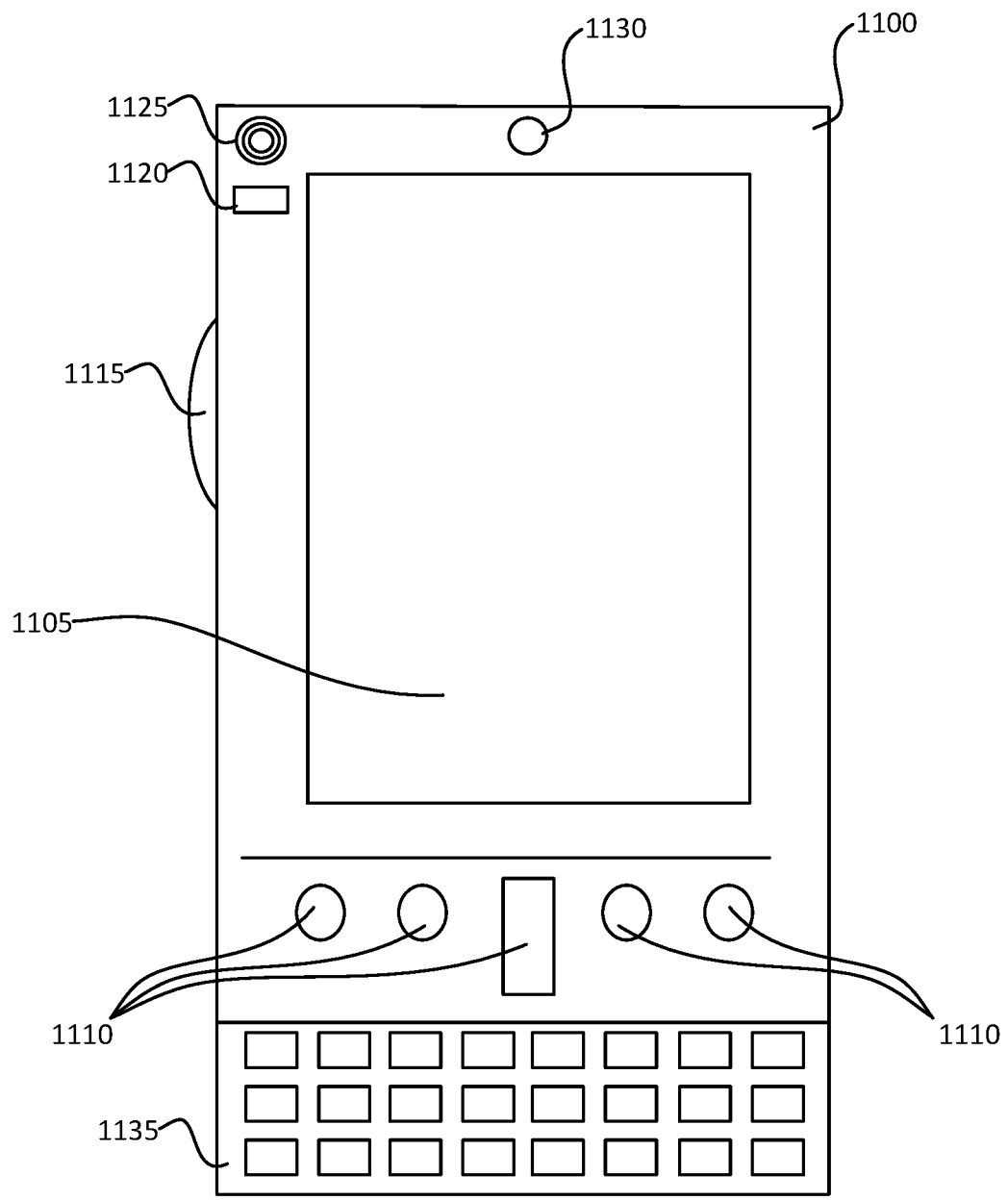
FIGS. 11A and 11B are simplified block diagrams of a mobile computing device with which aspects of the present disclosure may be practiced.
Figure 11B:
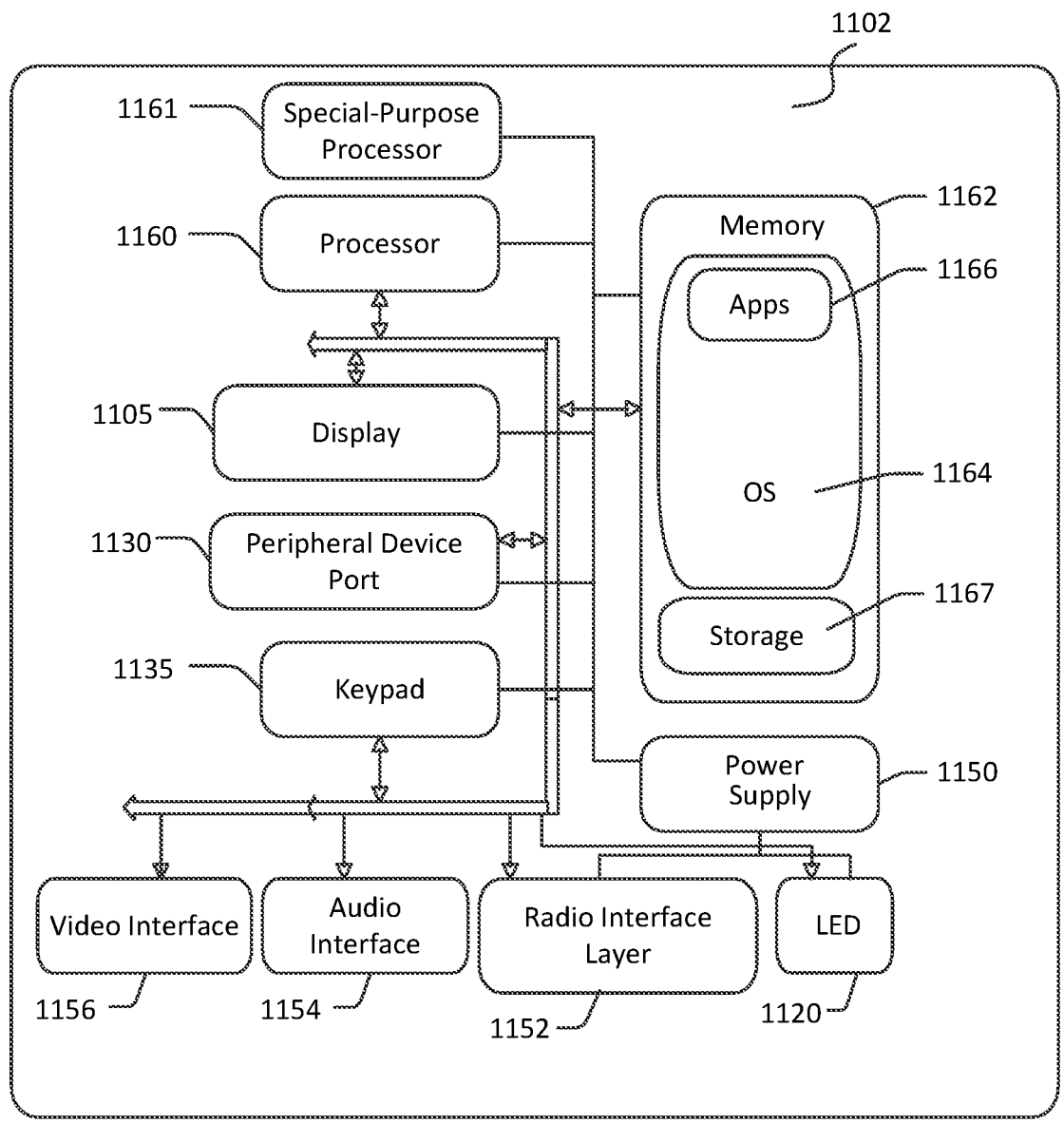

FIGS. 11A and 11B illustrate a mobile computing device 1100, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 11A, one aspect of a mobile computing device 1100 for implementing the aspects is illustrated. In a basic configuration, the mobile computing device 1100 is a handheld computer having both input elements and output elements. The mobile computing device 1100 typically includes a display 1105 and one or more input buttons 1110 that allow the user to enter information into the mobile computing device 1100. The display 1105 of the mobile computing device 1100 may also function as an input device (e.g., a touch screen display). If included, an optional side input element 1115 allows further user input. The side input element 1115 may be a rotary switch, a button, or any other type of manual input element. In alternative aspects, mobile computing device 1100 may incorporate more or less input elements. For example, the display 1105 may not be a touch screen in some embodiments. In yet another alternative embodiment, the mobile computing device 1100 is a portable phone system, such as a cellular phone. The mobile computing device 1100 may also include an optional keypad 1135. Optional keypad 1135 may be a physical keypad or a "soft" keypad generated on the touch screen display. In various embodiments, the output elements include the display 1105 for showing a graphical user interface (GUI), a visual indicator 1120 (e.g., a light emitting diode), and/or an audio transducer 1125 (e.g., a speaker). In some aspects, the mobile computing device 1100 incorporates a vibration transducer for providing the user with tactile feedback. In yet another aspect, the mobile computing device 1100 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one aspect of a mobile computing device. That is, the mobile computing device 1100 can incorporate a system (e.g., an architecture) 1102 to implement some aspects. In one embodiment, the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100 described herein (e.g., search engine, extractor module, relevancy ranking module, answer scoring module, etc.).

The system 1102 has a power supply 1170, which may be implemented as one or more batteries. The power supply 1170 might further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1120 may be used to provide visual notifications, and/or an audio interface 1174 may be used for producing audible notifications via the audio transducer 1125. In the illustrated embodiment, the visual indicator 1120 is a light emitting diode (LED) and the audio transducer 1125 is a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. In accordance with embodiments of the present disclosure, the microphone may also serve as an audio sensor to facilitate control of notifications, as will be described below. The system 1102 may further include a video interface 1176 that enables an operation of an on-board camera 1130 to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11B by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

Figure 12:
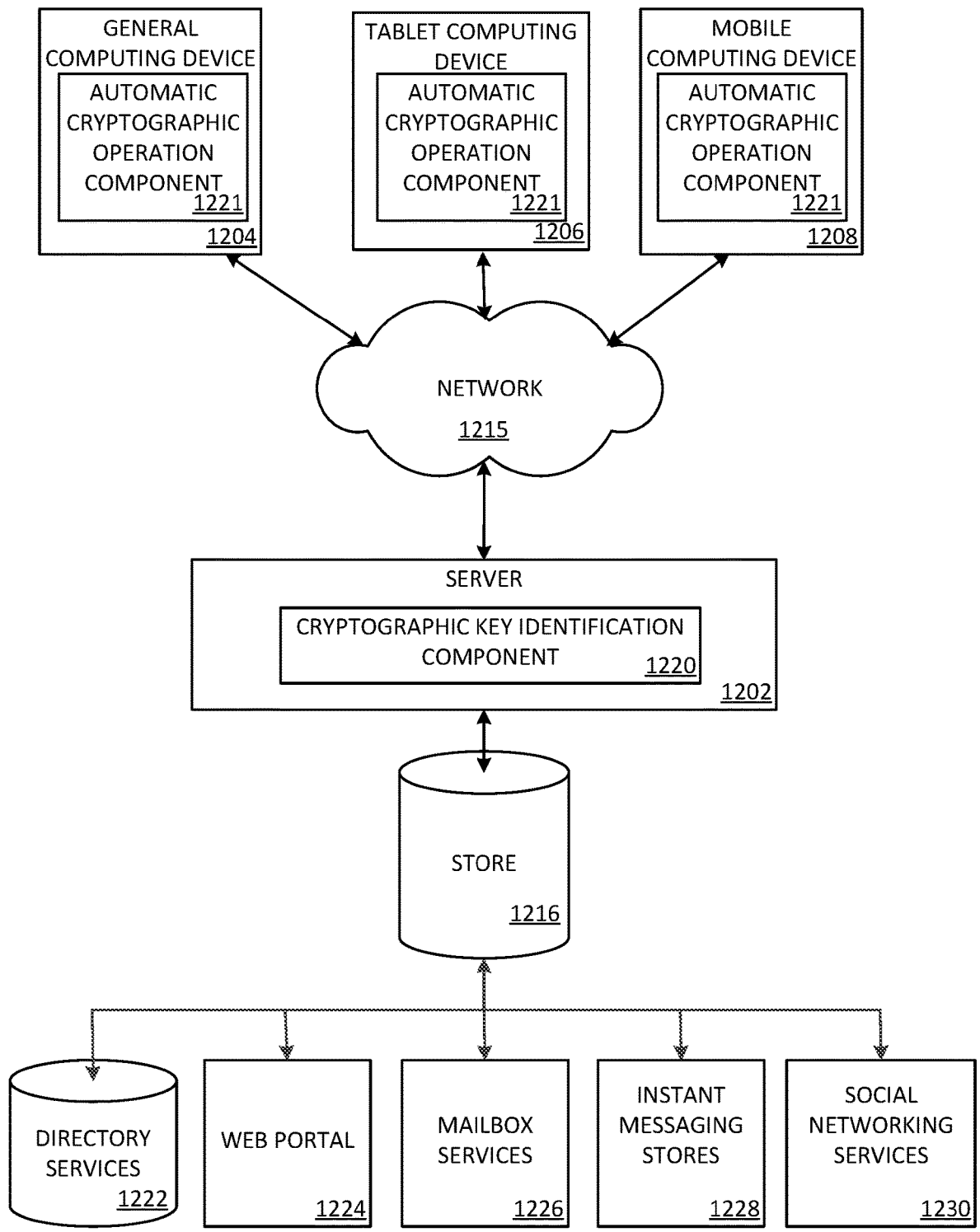
FIG. 12 is a simplified block diagram of a distributed computing system in which aspects of the present disclosure may be practiced.

FIG. 12 illustrates one aspect of the architecture of a system for processing data received at a computing system from a remote source, such as a personal computer 1204, tablet computing device 1206, or mobile computing device 1208, as described above. Content displayed at server device 1202 may be stored in different communication channels or other storage types. For example, various documents may be stored using a directory service 1222, a web portal 1224, a mailbox service 1226, an instant messaging store 1228, or a social networking site 1230. Automatic cryptographic operation component 1221 may be employed by a client that communicates with server device 1202, and/or cryptographic key identification component 1220 may be employed by server device 1202. The server device 1202 may provide data to and from a client computing device such as a personal computer 1204, a tablet computing device 1206 and/or a mobile computing device 1208 (e.g., a smart phone) through a network 1215. By way of example, the computer system described above may be embodied in a personal computer 1204, a tablet computing device 1206 and/or a mobile computing device 1208 (e.g., a smart phone). Any of these embodiments of the computing devices may obtain content from the store 1216, in addition to receiving graphical data useable to be either pre-processed at a graphic-originating system, or post-processed at a receiving computing system.

Figure 13:
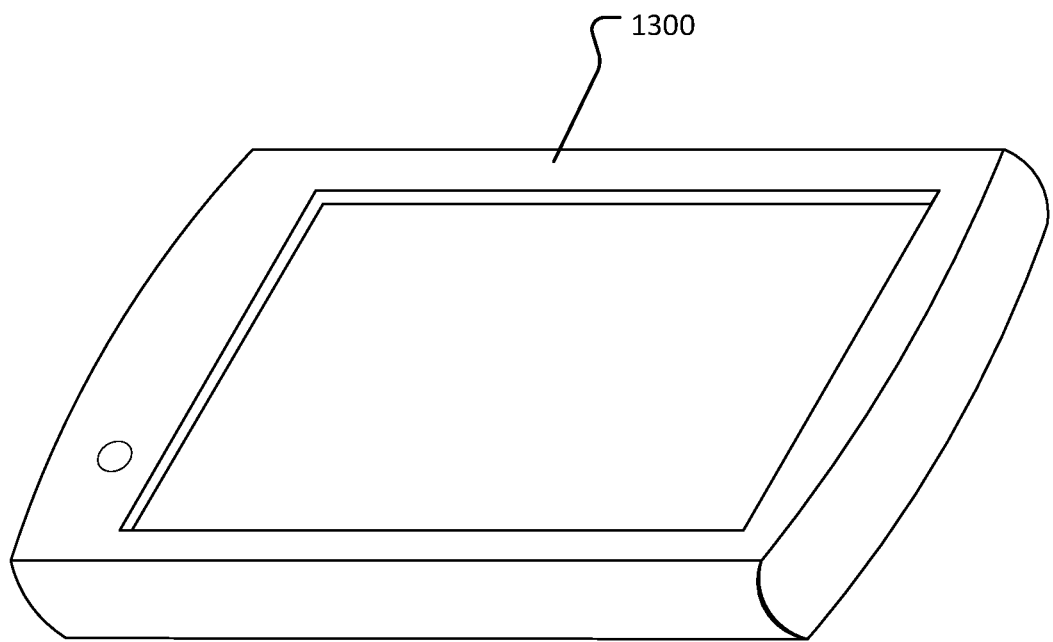
FIG. 13 illustrates a tablet computing device for executing one or more aspects of the present disclosure.

FIG. 13 illustrates an exemplary tablet computing device 1300 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and a memory storing instructions that when executed by the at least one processor perform a set of operations. The operations comprise accessing a resource stored by an isolated collection; identifying, based on one or more relationships of the resource, a user resource in the isolated collection, wherein the user resource is related to the resource; identifying, based on one or more relationships of the user resource, a cryptographic key resource in the isolated collection, wherein the cryptographic key resource is associated with the user resource; accessing, based on the cryptographic key resource, a cryptographic key; and performing a cryptographic operation on the resource using the cryptographic key. In an example, the cryptographic operation is one of: encrypting the resource for a user associated with the determined user resource; and verifying a cryptographic signature of the resource, wherein the resource was cryptographically signed by a user associated with the determined user resource. In another example, the identified cryptographic key resource is a key vault used to store cryptographic keys associated with the user resource, and accessing the cryptographic key comprises accessing the cryptographic key in the key vault. In a further example, the identified cryptographic key resource comprises a key identifier, and accessing the cryptographic key comprises evaluating the key identifier to determine a location of the cryptographic key. In yet another example, verifying the cryptographic signature of the resource further comprises: when it is determined that the cryptographic signature cannot be verified, providing an indication, wherein the indication is at least one of a notification, a visual indication, and an auditory indication; and when it is determined that the cryptographic signature can be verified, providing an indication, wherein the indication is at least one of a notification, a visual indication, and an auditory indication. In yet a further example, the resource is one of: a document; information relating to a document; a conversation; and a message. In another example, the cryptographic key is a public key of a cryptographic key pair, and wherein the private key of the cryptographic key pair is not stored in the key vault.

In another aspect, the technology relates to a computer-implemented method. The method comprises: generating a cryptographic key for use by a plurality of computing devices during a conversation session; for each computing device of the plurality of computing devices, encrypting the cryptographic key using a public key associated with the computing device and providing the encrypted cryptographic key to the computing device; receiving, from a computing device, a message of the conversation session; generating, using the cryptographic key, an encrypted message of the message; storing the encrypted message in an isolated collection, wherein the encrypted message is associated with the cryptographic key; and providing, to one or more of the plurality of computing devices, an indication of the encrypted message. In an example, the method further comprises: receiving, from a new computing device, a request for access to the conversation session; sending an authorization request to at least one computing device of the plurality of computing devices; receiving authorization from the at least one computing device of the plurality of computing devices; based on the received authorization: accessing the encrypted cryptographic key associated with the at least one computing device; generating, based on a private key associated with the at least one computing device, an unencrypted cryptographic key from the encrypted cryptographic key; generating, based on a public key associated with the new computing device, a re-encrypted cryptographic key from the unencrypted cryptographic key; and providing the re-encrypted cryptographic key to the new computing device. In another example, generating the encrypted message further comprises: signing, using a private key associated with the computing device, the message. In a further example, the cryptographic key is stored in escrow by a trusted third party. In yet another example, sending the authorization request to at least one computing device of the plurality of computing devices further comprises: identifying, based on one or more relationships of the encrypted message in the isolated collection, at least one computing device of the plurality of computing devices. In a further still example, the received authorization comprises information that may be used when generating the unencrypted cryptographic key.

In another aspect, the technology relates to another computer-implemented method for providing an encrypted conversation session. The method comprises: accessing a resource stored by an isolated collection; identifying, based on one or more relationships of the resource, a user resource in the isolated collection, wherein the user resource is related to the resource; identifying, based on one or more relationships of the user resource, a cryptographic key resource in the isolated collection, wherein the cryptographic key resource is associated with the user resource; accessing, based on the cryptographic key resource, a cryptographic key; and performing a cryptographic operation on the resource using the cryptographic key. In an example, the cryptographic operation is one of: encrypting the resource for a user associated with the determined user resource; and verifying a cryptographic signature of the resource, wherein the resource was cryptographically signed by a user associated with the determined user resource. In another example, the identified cryptographic key resource is a key vault used to store cryptographic keys associated with the user resource, and accessing the cryptographic key comprises accessing the cryptographic key in the key vault. In a further example, the identified cryptographic key resource comprises a key identifier, and accessing the cryptographic key comprises evaluating the key identifier to determine a location of the cryptographic key. In yet another example, verifying the cryptographic signature of the resource further comprises: when it is determined that the cryptographic signature cannot be verified, providing an indication, wherein the indication is at least one of a notification, a visual indication, and an auditory indication; and when it is determined that the cryptographic signature can be verified, providing an indication, wherein the indication is at least one of a notification, a visual indication, and an auditory indication. In yet a further example, the resource is one of: a document; information relating to a document; a conversation; and a message. In another example, the cryptographic key is a public key of a cryptographic key pair, and the private key of the cryptographic key pair is not stored in the key vault.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   a memory storing instructions that when executed by the at least one processor perform a set of operations comprising:
      accessing a data resource from an isolated collection comprising the data resource, a user resource, and a cryptographic key resource;
      identifying, based on a first relationship in the isolated collection between the user resource and the data resource, the user resource associated with a user identifier of the isolated collection;
      identifying, based on a second relationship in the isolated collection between the cryptographic key resource and the user resource, the cryptographic key resource associated with a cryptographic key for the user identifier;
      accessing, based on the cryptographic key resource, the cryptographic key for the user identifier; and
      performing, using the cryptographic key, a cryptographic operation on the data resource.

2. The system of claim 1, wherein the cryptographic operation is one of:
   encrypting the data resource for the user identifier associated with the user resource; or
   verifying a cryptographic signature of the data resource, wherein the data resource was cryptographically signed by the user identifier associated with the determined user resource.

3. The system of claim 1, wherein the identified cryptographic key resource is a key vault used to store cryptographic keys associated with the user resource, and accessing the cryptographic key comprises accessing the cryptographic key in the key vault.

4. The system of claim 1, wherein the identified cryptographic key resource comprises a key identifier, and accessing the cryptographic key comprises evaluating the key identifier to determine a location of the cryptographic key.

5. The system of claim 2, wherein verifying the cryptographic signature of the data resource further comprises:
   when it is determined that the cryptographic signature cannot be verified, providing an indication, wherein the indication is at least one of a notification, a visual indication, and an auditory indication; and
   when it is determined that the cryptographic signature can be verified, providing an indication, wherein the indication is at least one of a notification, a visual indication, and an auditory indication.

6. The system of claim 1, wherein the data resource is one of:
   a document;

information relating to a document;
a conversation; and
a message.

7. The system of claim 3, wherein the cryptographic key is a public key of a cryptographic key pair, and wherein the private key of the cryptographic key pair is not stored in the key vault.

8. A computer-implemented method, the method comprising:
generating a cryptographic key for use by a plurality of computing devices during a conversation session;
for each computing device of the plurality of computing devices:
encrypting, the cryptographic key using a public key associated with the computing device; and
providing the encrypted cryptographic key to the computing device;
receiving, from a computing device, a message of the conversation session;
generating, using the cryptographic key, an encrypted message of the message;
storing the encrypted message in an isolated collection, wherein the encrypted message is associated with the cryptographic key by a relationship between the encrypted message and a cryptographic key resource, and wherein the cryptographic key resource is associated with the cryptographic key; and
providing, to one or more of the plurality of computing devices, an indication of the encrypted message.

9. The computer-implemented method of claim 8, further comprising:
receiving, from a new computing device, a request for access to the conversation session;
sending an authorization request to at least one computing device of the plurality of computing devices;
receiving authorization from the at least one computing device of the plurality of computing devices;
based on the received authorization:
accessing the encrypted cryptographic key associated with the at least one computing device;
generating, based on a private key associated with the at least one computing device, an unencrypted cryptographic key from the encrypted cryptographic key;
generating, based on a public key associated with the new computing device, a re-encrypted cryptographic key from the unencrypted cryptographic key; and
providing the re-encrypted cryptographic key to the new computing device.

10. The computer-implemented method of claim 8, wherein generating the encrypted message further comprises:
signing, using a private key associated with the computing device, the message.

11. The computer-implemented method of claim 8, wherein the cryptographic key is stored in escrow by a trusted third party.

12. The computer-implemented method of claim 9, wherein sending the authorization request to at least one computing device of the plurality of computing devices further comprises:
identifying, based on one or more relationships of the encrypted message in the isolated collection, at least one computing device of the plurality of computing devices.

13. The computer-implemented method of claim 9, wherein the received authorization comprises information that may be used when generating the unencrypted cryptographic key.

14. A computer-implemented method for providing an encrypted conversation session, the method comprising:
accessing a data resource from an isolated collection comprising the data resource, a user resource, and a cryptographic key resource;
identifying, based on a first relationship in the isolated collection between the user resource and the data resource, the user resource associated with a user identifier of the isolated collection;
identifying, based on a second relationship in the isolated collection between the cryptographic key resource and the user resource, the cryptographic key resource associated with the cryptographic key for the user identifier;
accessing, by the computing device based on the cryptographic key resource, the cryptographic key for the user identifier; and
performing, using the cryptographic key, a cryptographic operation on the data resource.

15. The computer-implemented method of claim 14, wherein the cryptographic operation is one of:
encrypting the data resource for the user identifier associated with the user resource; or
verifying a cryptographic signature of the data resource, wherein the data resource was cryptographically signed by the user identifier associated with the determined user resource.

16. The computer-implemented method of claim 14, wherein the identified cryptographic key resource is a key vault used to store cryptographic keys associated with the user resource, and accessing the cryptographic key comprises accessing the cryptographic key in the key vault.

17. The computer-implemented method of claim 14, wherein the identified cryptographic key resource comprises a key identifier, and accessing the cryptographic key comprises evaluating the key identifier to determine a location of the cryptographic key.

18. The computer-implemented method of claim 15, wherein verifying the cryptographic signature of the data resource further comprises:
when it is determined that the cryptographic signature cannot be verified, providing an indication, wherein the indication is at least one of a notification, a visual indication, and an auditory indication; and
when it is determined that the cryptographic signature can be verified, providing an indication, wherein the indication is at least one of a notification, a visual indication, and an auditory indication.

19. The computer-implemented method of claim 14, wherein the data resource is one of:
a document;
information relating to a document;
a conversation; and
a message.

20. The computer-implemented method of claim 17, wherein the cryptographic key is a public key of a cryptographic key pair, and the private key of the cryptographic key pair is not stored in the key vault.

* * * * *